US011861571B2

(12) United States Patent
Allen et al.

(10) Patent No.: US 11,861,571 B2
(45) Date of Patent: Jan. 2, 2024

(54) METHOD AND SYSTEM FOR STABILIZING DIGITAL CURRENCY

(71) Applicant: Infrared5, Inc., Jamaica Plain, MA (US)

(72) Inventors: Chris Allen, Jamaica Plain, MA (US); Davide Lucchi, Cerea (IT)

(73) Assignee: Infrared5, Inc., Jamaica Plain, MA (US)

( * ) Notice: Subject to any disclaimer, the term of this patent is extended or adjusted under 35 U.S.C. 154(b) by 0 days.

(21) Appl. No.: 17/517,706

(22) Filed: Nov. 3, 2021

(65) Prior Publication Data

US 2022/0122046 A1  Apr. 21, 2022

Related U.S. Application Data

(63) Continuation of application No. 16/230,442, filed on Dec. 21, 2018, now abandoned.

(51) Int. Cl.
*G06Q 40/04* (2012.01)
*G06Q 20/06* (2012.01)
*G06Q 20/38* (2012.01)

(52) U.S. Cl.
CPC ....... *G06Q 20/0655* (2013.01); *G06Q 20/381* (2013.01); *G06Q 40/04* (2013.01)

(58) Field of Classification Search
CPC ... G06Q 20/0655; G06Q 20/381; G06Q 40/04
USPC .................................................. 705/41, 35
See application file for complete search history.

(56) References Cited

U.S. PATENT DOCUMENTS

| 8,699,336 | B2 | 4/2014 | Huo |
| 2013/0191518 | A1 | 7/2013 | Narayanan et al. |
| 2015/0170112 | A1 | 6/2015 | DeCastro |
| 2015/0235282 | A1 | 8/2015 | Kamath |
| 2017/0213289 | A1 | 7/2017 | Doney |
| 2017/0277909 | A1 | 9/2017 | Kraemer et al. |
| 2018/0181925 | A1* | 6/2018 | Lamison-White ... G06Q 20/405 |
| 2018/0211043 | A1 | 7/2018 | Husain |
| 2018/0268382 | A1 | 9/2018 | Wasserman |
| 2020/0143085 | A1* | 5/2020 | Cooner .................. G06F 21/64 |
| 2020/0202311 | A1 | 6/2020 | Allen et al. |

FOREIGN PATENT DOCUMENTS

EP  3 899 840 A1  10/2021

OTHER PUBLICATIONS

Cryptocurrency and the problem of Intermediation Harwick (Year: 2016).*

(Continued)

*Primary Examiner* — William E Rankins
(74) *Attorney, Agent, or Firm* — Patent GC LLC

(57) ABSTRACT

The present invention is directed to systems and methods for maintaining a stabilized digital currency is provided. The systems and methods include monitoring for one or more digital transactions in a service provider network utilizing digital coins, minting and storing a predetermined percentage of reserve tokens of the digital coins in a reserve pool, providing compensation for the one or more digital transactions as utility tokens of the digital coins, and monitoring current value of the digital coins for the digital currency for inflation or deflation.

20 Claims, 19 Drawing Sheets

(56) References Cited

OTHER PUBLICATIONS

Virtual Currencies, the Money Market and Monetary Policy Sauer (Year: 2016).*

The Quantity Theory of Money: Its Historical Evolution and Role in Policy Debate Thomas Humphrey, Economic Review (Year: 1974).*

Non Final Office Action received for U.S. Appl. No. 16/230,442 dated Nov. 25, 2020, 30 Pages.

"Tether: Fiat Currencies on the Bitcoin Blockchain", https://tether.to/wp-content/uploads/2016/06/TetherWhitePaper.pdf, last accessed May 21, 2019, 20 Pages.

Al-Naji, et al., "Basis: A Price-Stable Cryptocurrency with an Algorithmic Central Bank", Basecoin, Version 0.99.7, URL: www.basis.io, Jun. 20, 2017, 27 Pages.

Amazon Web Services, Inc., "Amazon Web Services—Simple Monthly Calculator", https://calculator.s3.amazonaws.com/index.html, last accessed May 21, 2019, 2 Pages.

Bordo, et al., "Central Bank Digital Currency and the Future of Monetary Policy", NBER working paper series, Retrieved from the Internet on Feb. 10, 2020, Aug. 31, 2017, 32 pages.

Brent, et al., "Reserve Stabilization Protocol", URL: https://uploads-ssl.webflow.com/5c0649fb67dd7b3627d59953/5c092732e4eab1547fa9bd0c_whitepaper.pdf., Nov. 30, 2018, 29 Pages.

Brooks, et al., "A Decentralized Payment Network and Stablecoin v0.8", HAVVEN, Jun. 11, 2018, 31 Pages.

Clark, et al., "Demystifying Stablecoins: Cryptography meets Monetary Policy", ACM Queue, Jan.-Feb. 2020, 22 Pages.

Doran, et al., "Emergent Economies for Pole Playing Games", Technical Report LARC-2010-03, Laboratory for Recreational Computing Department Science & Engineering University of North Texas, Jun. 23, 2010, 24 Pages.

European Patent Office, "Extended European Search Report Received", European Application No. 19898744.8, dated Jul. 22, 2022, 8 Pages.

Github, Inc., "https://github.com/larsiusprime/bazaarBot", last accessed May 21, 2019, 2 pages.

Harwick, "Cryptocurrency and the problem of Intermediation", The Independent Review, vol. 20, No. 4, Spring 2016, ISSN 1086-1653, Copyright © 2016, pp. 569-588.

Klages-Mundt, et al., "Stablecoins 2.0: Economic Foundations and Risk-based Models", AFT '20: Proceedings of the 2nd ACM Conference on Advances in Financial Technologies, Oct. 2020, 21 Pages.

Lipton, et al., "Digital trade coin: towards a more stable digital currency", Royal Society Open Science, URL: https://royalsocietypublishing.org/doi/pdf/10.1098/rsos.180155, Jun. 18, 2018, 15 Pages.

Sauer, "Virtual Currencies, the Money Market, and Monetary Policy", International Advances in Economic Research, Apr. 26, 2016, 15 Pages.

Shibano, et al., "Volatility Reducing Effect by Introducing a Price Stabilization Agent on Cryptocurrencies Trading", ICBCT'20: Proceedings of the 2020 the 2nd International Conference on Blockchain Technology, Mar. 2020, 5 Pages.

Silva, et al., "Cryptocurrency Compensation: A Primer on Token-Based Awards", Harvard Law School Forum on Corporate Governance, May 19, 2018, pp. 1-6.

Tang, "Systematic Market Control of Cryptocurrency Inflations", BCC '18: Proceedings of the 2nd ACM Workshop on Blockchains, Cryptocurrencies and Contracts, Jun. 4, 2018, 3 Pages.

U.S. Patent and Trademark Office, "Final Office Action received", U.S. Appl. No. 16/230,442, dated Jun. 4, 2021, 43 Pages.

U.S. Patent and Trademark Office, "International Search Report and Written Opinion Received", International Application No. PCT/US2019/067767, dated Mar. 2, 2020, 13 pages.

WIPO, "International Preliminary Report on Patentability", International Application No. PCT/US2019/067767, dated Jul. 1, 2021, 12 Pages.

\* cited by examiner

METHOD AND SYSTEM FOR STABILIZING DIGITAL CURRENCY

FIELD OF THE INVENTION

The present invention relates to a system and method suitable for stabilizing a value of digital currency. In particular, the present invention relates to a system and method for stabilizing digital coins using a combination of tokens to adjust a value of the digital coins.

BACKGROUND

Generally, cryptocurrencies are digital assets that use strong cryptography to secure financial transactions, control the creation of additional units, and verify the transfer of said transactions. Cryptocurrency networks typically utilize a blockchain to validate transactions and provide tokens or coins and rewards miners that contribute to the validation process. Tokens or coins that are earned by contributors can be utilized in other financial transactions either through trading, market exchanges, or other exchanges. Unlike traditional currencies, cryptocurrencies primarily operate outside existing banking and governmental institutions. Therefore, it is important to try and provide stabilization of the tokens and coins to make them a reliable currency for users.

Traditionally, stabilization methods and systems rely on third party human intervention to assist in stabilizing a value of a coin. For example, some systems can sell bonds to individuals in an effort provide a vehicle for stabilizing coin values. Relying on bonds, however, requires active and manual participation from users outside of the system utilizing the coins. Conventional solutions to provide a stable token can utilize and typically involve having the tokens be backed by fiat currency. For example, a token can be backed by fiat current that guarantees that each token always has a set value (e.g., equal to $1).

SUMMARY

There is a need for improvements for stabilizing digital currency, particularly ERC-20 tokens. The present invention is directed toward further solutions to address this need, in addition to having other desirable characteristics. Specifically, there is a need for systems and methods to create a stable token without the reliance on manual user intervention. The present invention provides token stabilization based on algorithms such that there is no need to create an incentive for users to participate in the stabilization of the token This should make the stabilization easier to achieve. The present invention can be utilized for virtually any use case that requires a stable token and involves transactions.

In accordance with example embodiments of the present invention, a method for maintaining a stabilized digital currency is provided. The method includes monitoring for one or more digital transactions in a service provider network utilizing digital coins, minting and storing a predetermined percentage of reserve tokens of the digital coins in a reserve pool, providing compensation for the one or more digital transactions as utility tokens of the digital coins, and monitoring current value of the digital coins for the digital currency for inflation or deflation.

In accordance with aspects of the present invention, the monitoring the current value of the digital coins for the digital currency for inflation or deflation includes monitoring an amount of supply of the digital coins, identifying an inflation period or deflation period in the digital coins based on the current value and the amount of supply of the digital coins, determining an amount for a new supply of digital coins to stabilize the inflation period or deflation period, and converting at least one of utility tokens to reserve tokens or reserve tokens to utility tokens to meet the new supply of digital coins and the value of the digital coins is stabilized. The inflation period can require converting the reserve tokens to the utility tokens. The deflation period can require converting the utility tokens to the reserve tokens.

In accordance with aspects of the present invention, the digital coins include utility tokens used for trading and compensation for services provided. The method can further include maintaining the reserve tokens in a fixed size reserve pool and a variable size investor pool. The reserve tokens can be distributed within at least one of the reserve pool and the investor pool to stabilize the utility token values. The reserve tokens in the investor pool can be periodically converted to payment to investors. The digital currency can include security tokens representing tradeable shares that are used to pay periodic dividends. The investor pool can be configured to store reserve tokens from a current period of time in a first portion, store reserve tokens from a previous period of time in a second portion, and pay out the reserve tokens the previous period of time to investors at an end of the current period of time.

In accordance with example embodiments of the present invention, system for maintaining a stabilized digital currency is provided. The method includes at least one miner node for triggering digital currency transactions that affect at least one of a current value or an amount of supply of digital coins for the digital currency and a stabilizer device designed to monitor for one or more digital transactions in a service provider network utilizing digital coins, mint and store a predetermined percentage of reserve tokens of the digital coins in a reserve pool, provide compensation for the one or more digital transactions as utility tokens of the digital coins, and monitor current value of the digital coins for the digital currency for inflation or deflation.

In accordance with aspects of the present invention, the monitoring the current value of the digital coins for the digital currency for inflation or deflation includes monitoring an amount of supply of the digital coins, identifying an inflation period or deflation period in the digital coins based on the current value and the amount of supply of the digital coins, determining an amount for a new supply of digital coins to stabilize the inflation period or deflation period, and converting at least one of utility tokens to reserve tokens or reserve tokens to utility tokens to meet the new supply of digital coins and the value of the digital coins is stabilized. The inflation period can require converting the reserve tokens to the utility tokens. The deflation period can require converting the utility tokens to the reserve tokens.

In accordance with aspects of the present invention, the digital coins can include utility tokens used for trading and compensation for services provided. The system can further include maintaining the reserve tokens in a fixed size reserve pool and a variable size investor pool. The reserve tokens can be distributed within at least one of the reserve pool and the investor pool to stabilize the utility token values. The reserve tokens in the investor pool can be periodically converted to payment to investors. The digital currency includes security tokens representing tradeable shares that can be used to pay periodic dividends. The investor pool can be configured to store reserve tokens from a current period of time in a first portion, store reserve tokens from a previous period of time in a second portion, and pay out the reserve tokens the previous period of time to investors at an end of the current period of time.

In accordance with example embodiments of the present invention, computer program product for maintaining a stabilized digital currency, is provided. The computer program product includes a computer readable storage medium having program instructions embodied therewith, the program instructions readable/executable by one or more computing devices to cause the one or more computing devices to monitor for one or more digital transactions in a service provider network utilizing digital coins, mint and store a predetermined percentage of reserve tokens of the digital coins in a reserve pool, provide compensation for the one or more digital transactions as utility tokens of the digital coins, and monitor current value of the digital coins for the digital currency for inflation or deflation.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
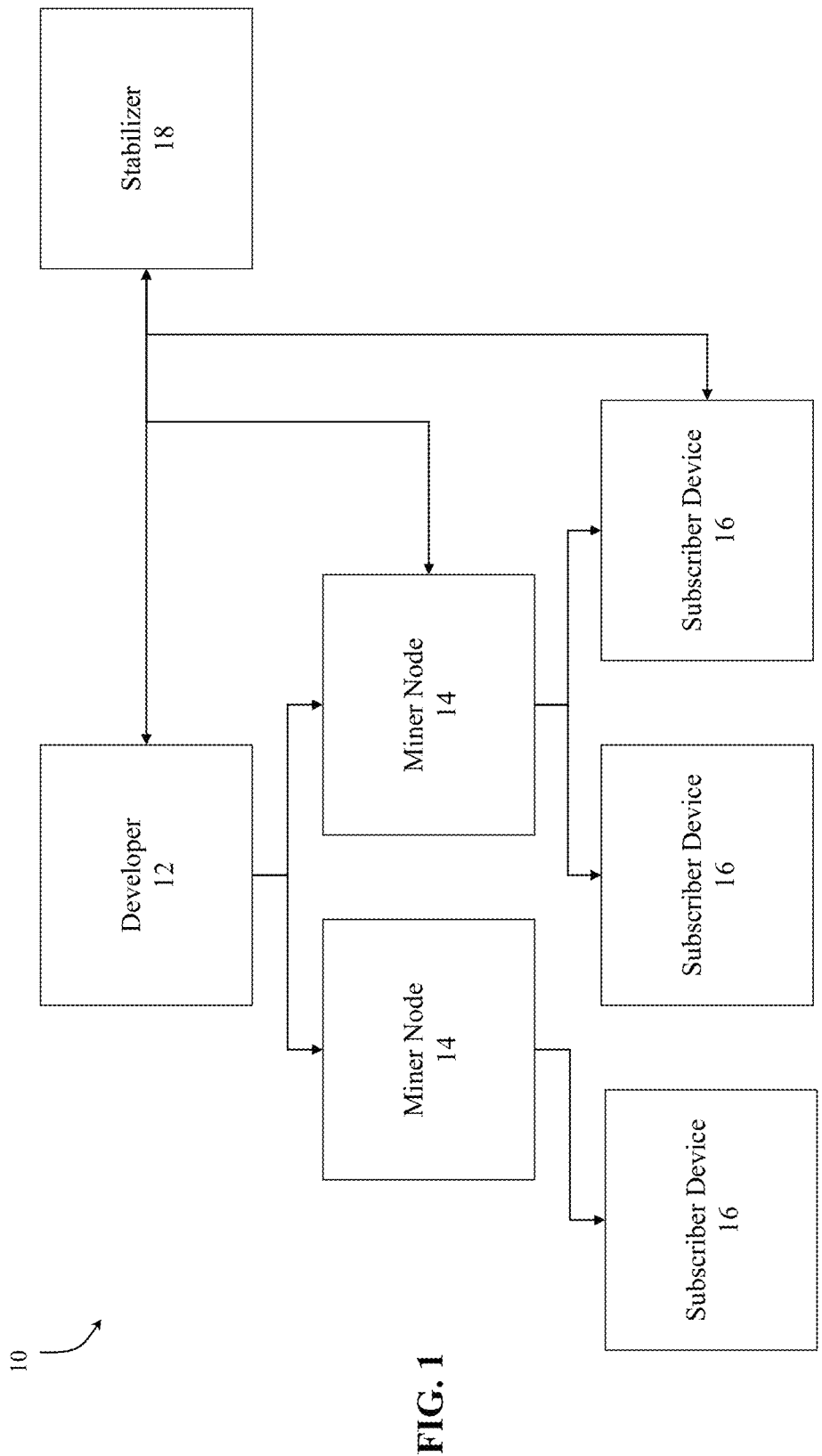
FIG. 1 is an exemplary system for implementing the present invention.

An illustrative embodiment of the present invention relates to a system and method for stabilizing digital coins utilized in a cryptocurrency based network. In operation, the present invention provides digital coins as part of a cryptocurrency compensation system In some embodiments, the digital coins can be ERC-20 tokens or similar digital tokens used by developers to compensate miners for the resources that they are providing to a network/service. The digital coins can be cryptocurrency tokens earned for participation within a blockchain and/or purchased through an exchange. In some embodiments, the digital coins can be used by network users to make transactions and compensate miners or other users participating within a network. For example, the digital coins of the present invention can be used to compensate nodes for relaying streams (e.g., providing bandwidth and other computational resources) for a broadcasting service provider and/or to buy access to video streams, as discussed in greater detail with respect to U.S. patent application Ser. No. 15/954,473, now U.S. Pat. No. 10,848,553, incorporated herein by reference.

FIGS. 1 through 15, wherein like parts are designated by like reference numerals throughout, illustrate an example embodiment or embodiments of improved operation for providing stable digital coins or tokens for a cryptocurrency, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts an exemplary system 10 for implementing aspects of the present invention. In particular, FIG. 1 depicts an illustrative system 10 for use in accordance with the method for providing a service to end users and compensating third parties for assisting in providing said service. In some embodiments, the compensation earned in said service can be digital currency or digital coins. The system 10 can include a network of devices that can include at least one developer 12 (e.g., broadcaster), a plurality of miner nodes 14 (e.g., edge nodes), and a plurality of subscriber devices 16 (e.g., subscriber devices). In some embodiments, the developer 12 is configured as a service provider that utilizes one or more intermediary miner nodes 14 to supply services to subscriber device 16. For example, the developer 12 can be a broadcasting service provider configured to offer multimedia streaming services to subscribers for a fee. The multimedia can be delivered to subscriber devices 16 using a combination of miner nodes 14 that volunteer their resources (e.g., bandwidth) in exchange for compensation (e.g., digital coins). In exchange for delivering the multimedia to subscriber devices 16 on behalf of the developer 12, the developer 12 will compensate the miner nodes 14 with digital coins. An example of such a system and method is discussed in greater detail with respect to U.S. Patent Applications 62/535,263, to which U.S. Pat. No. 11,425,113 claims priority, and Ser. No. 15/954,473, now U.S. Pat. No. 10,848,553, incorporated herein by reference.

In some embodiments, the system 10 can include a stabilizer 18 that is configured to monitor transactions throughout the network of developers 12, miner nodes 14, and subscriber devices 16 and monitor the value of a digital coin (e.g., via exchange) associated with actions associated with said network. In particular, the stabilizer 18 can monitor for transactions in which digital coins are exchanged and run a stabilization algorithm to evaluate the value of the digital tokens and actions needed to stabilize the value, if necessary. For example, the stabilizer 18 can identify each instance that a developer 12 provides digital coins to miners 14, in exchange for services performed (e.g., mining, providing services to subscriber devices 16, etc.), and run a stabilization process. The stabilizer 18 can be an integral part of the token (e.g., ERC-20) and its logic can be written in the smart contract of the token.

In some embodiments, each of the developer 12, the plurality of miner nodes 14, the plurality of subscriber devices 16, and the stabilizer 18 can be a general-purpose computer or a specialized computing system. For example, the developer 12 can include a single computing device, a collection of computing devices in a network computing system, a cloud computing infrastructure, or a combination thereof. Similarly, each of the developer 12, the plurality of miner nodes 14, the plurality of subscriber devices 16, and the stabilizer 18 can be configured to establish a connection and communicate with one another over a telecommunication network(s). As would be appreciated by one of skill in the art, the telecommunication network(s) may include any combination of known networks. For example, the telecommunication network(s) may be combination of a mobile network, WAN, LAN, or other type of network. The telecommunication network(s) may be used to exchange data between the each of the developer 12, the plurality of miner nodes 14, the plurality of subscriber devices 16, and the stabilizer 18 and/or to collect data from additional sources.

In some embodiments, the stabilization of the digital coins of the present invention can be provided by three main components, where each of the components can be associated with a different ERC-20 token (or other token standard). The three types of tokens can be identified as utility tokens, reserve tokens, and security tokens.

All of the transactions within the system 10 of the present invention can involve one or more of the utility tokens, reserve tokens and security tokens for the digital coins. In some embodiments, the digital coins can define transfer and transferFrom functions based on the ERC-20 token standard, such that said functions are called every time some of the utility tokens, reserve tokens and security tokens for the digital coins are transferred between different accounts and/or locations (e.g., being used as compensation, bought, sold, traded, converted, etc.). The stabilization algorithm can be run for every time a digital coin transaction occurs, and can be implemented within the transfer and transferFrom functions. In other words, any transaction involving the token changing ownership ensures that the stabilization process (e.g., as discussed with respect to FIGS. 2-7) is automatically run. This makes it possible to use this design for any and all use cases that require a stable cryptocurrency or digital currency. In this way, the digital coins can be stabilized no matter how they are used because the same functions are used to transfer the tokens between parties. This functionality protects the stabilization, even if some party chooses to list the digital coins on an exchange, or the token is used for purposes outside of the network of the present invention.

In some embodiments, the utility tokens can represent a stable token of the digital coins tied to a fiat currency and can be allocated as an initial fixed quantity of tokens to be distributed as compensation. The token can be traded in an exchange, or it can be used by the network to compensate minors providing services within a system (e.g., system 10). The market cap will be modified over time to guarantee that digital coins equals a target value of $1 USD. For example, the utility tokens can have a target value of $1 USD per token. As would be appreciated by one skilled in the art, any combination of quantity, fiat currency, and target value can be utilized without departing from the scope of the present invention. In some embodiments, the target value can be pegged to the value of a Consumer Price Index (CPI). In this way, it would be possible to implement a decentralized and transparent money policy that does not require any human input and that can be independent from any government or official agency.

In some embodiments, the reserve tokens can be utilized to help regulate the value of utility tokens (e.g., digital coins). The value of the reserve tokens is equal to that of utility tokens and can be used to adjust market value of digital coins for stabilization. The reserve tokens can be stored and transferred between a reserve pool and an investor pool. During operation, the reserve tokens can be transitioned between the two pools or be converted back into utility tokens for distribution. In some embodiments, after a predetermined period of time, a portion of the reserve tokens can be withdrawn from the investor pool for distribution to investor as part of a dividend. For example, at the end of each financial quarter a portion of the reserve tokens within the investor pool can converted into Ethereum (ETH) shares or fiat money to compensate investors. In an alternative embodiment, the system can function without utilization of an investor pool. For example, instead of transferring tokens to the investor pool, the system can "burn" unneeded tokens without payouts, or just let the number of reserve tokens increase indefinitely.

In some embodiments, the security tokens represent a proportion of shares investing the digital coins and can influence how distributions can be paid out as a dividend. In particular, the security tokens can represent a percentage of the shares of digital coins that an investor owns in the digital currency and can be traded on an exchange dealing in cryptocurrencies.

In some embodiments, the value for the digital coins can be pegged to a government issued currency (e.g., fiat currency). For example, one unit of the digital coins can be pegged to one United States Dollar (USD), such that one digital coins is worth $1 USD. In some embodiments, the volume of the digital coins will be controlled such that only a fixed amount of digital coins will be put in circulation at a given point in time. An initial value and volume of digital coins supply will generate a market cap. The market cap can be determined by multiplying the number of digital coins in circulation by the value per coin. For example, if 5 thousand digital coins are in circulation at an initial price of $1 USD, then the market cap will be $5,000. In some embodiments, if the equivalence between digital coins and USD changes, the system and method of the present invention can modify the amount of digital coins in circulation, by minting or burning tokens, and thus bringing back the market cap to its initial value. A result of such modification, the equivalence of digital coins to USD can be re-established.

Figure 2:
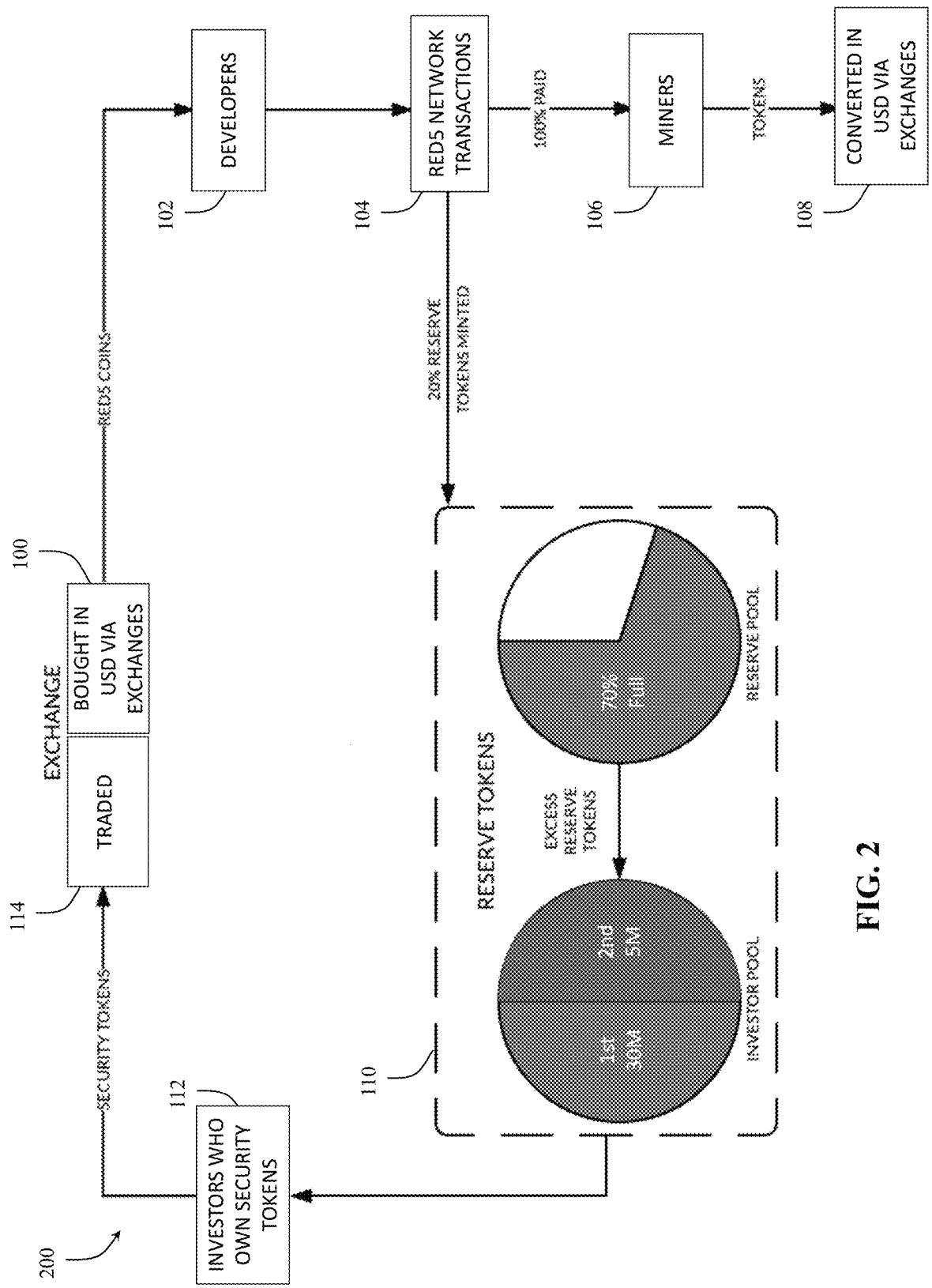
FIG. 2 is an example process using different tokens for stabilizing digital coins, in accordance with the present invention.

FIG. 2 provides an exemplary process 200 for providing the method for stabilizing digital coins in accordance with the present invention. In particular, FIG. 2 depicts an initial diagram of the process 200 for how the stabilizer 18 monitors transactions and utilizes the different tokens to maintain stability of the digital coins (e.g., try to maintain the pegged currency value). During an initial setup of the process 200, a predetermined quantity of digital coins is made available to investors (e.g., as security tokens) for trade on an exchange and to developers or service providers (e.g., as utility tokens) to be provided as compensation to miner nodes 14 dedicating resources to the developers or service providers within the system 10.

At step 100, some predetermined quantity of digital coins are purchased or otherwise obtained by developers for use within their network. In some embodiments, the tokens can be made available via a trading exchange platform or purchase from a bank source. In some embodiments, the tokens are made available to users through a smart contract on a blockchain. At step 102 some portion of the initial quantity of digital coins is made available to developers as utility tokens for distribution as compensation in return for services rendered by miners (e.g., via system 10). In some embodiments, the developers are multimedia broadcasters that use intermediary miner nodes to stream multimedia to subscribing user devices and compensates with the utility tokens.

At step 104 digital coin transactions are performed within the service provider network (e.g., system 10) and reserve tokens are minted based on those transaction (i.e., an amount of compensation to be paid to miners for that transaction). In some embodiments, digital coin transactions can be work performed by miner nodes 14 on behalf of developers 12 in exchange for digital coin compensation (e.g., in utility tokens). For example, at step 104, miner nodes can receive a multimedia stream from a developer and transmit the multimedia the subscribing end users in return for digital coin compensation. In response to such a transaction, in some embodiments, the process 200 can initiate a minting process in which a percentage of reserve tokens are minted and added to a reserve pool and/or investor pool. The amount of minted reserve tokens can be constant and equal to the number of digital coins that are being transferred in the transaction (e.g., during stable periods) or the amount can be variable based on circumstances (e.g., inflation period, depression period, etc.), as discussed in greater detail herein. For example, as depicted in FIG. 2, 20% of the digital coin compensation paid to the miners can be minted as reserve tokens. As would be appreciated by one skilled in the art, any value can be used for minting reserve tokens and is not limited to 20% of the compensation paid or even tied to the compensation paid. The percentage amount can fluctuate and support just about any percentage of the total paid to miners, such that the more transactions the system is experiencing, could result in a lower the percentage needed per transaction to stabilize the token At step 106 a compensation of utility tokens can be paid to the miners in exchange for services provided on behalf of the developers. In some embodiments, the compensation can be in the form of utility tokens or can be paid in digital coins (converted from utility tokens) according to a previously agreed rate. The amount or percentages of the agreed upon compensation can be paid in full or reduced based on circumstances (e.g., inflation period, depression period, etc.), as discussed in greater detail herein. For example, as depicted in FIG. 2, 100% of the agreed upon compensation can be paid to the miners. At step 108 the miners can elect to convert any received tokens or coins to fiat currency (e.g., USD) or other currency (e.g., digital currency) through one or more exchanges.

At step 110 the reserve tokens minted in step 104 can be allocated to the reserve pool and/or the investor pool. The reserve pool can have a fixed size while the investor pool can be used to hold the surplus of reserve tokens. The present invention is always adjusting to guarantee that the reserve pool is full. Thus, when new tokens are minted, if the reserve pool is not full they will be stored there, otherwise, they will be stored in the investor pool. The purpose of the reserve pool is to always have a minimal amount of reserve tokens that can be converted back into utility tokens during an inflation period, as discussed in greater detail herein. The amount of reserve tokens needed can vary based on the amount of inflation experienced by the digital coin value. In some embodiments, during an inflation period the amount needed may be higher than 100%.

In some embodiments, reserve tokens stored in the investor pool can be allocated based on a predetermined period of time in which they were received and paid out periodically to investors who own security tokens. For example, reserve tokens can be stored in the investor pool based on the fiscal quarter when they were generated and at the end of every quarter the reserve tokens from the previous quarter will be paid out to investors proportionally to their security tokens (e.g., shares). The amount of reserve tokens in the investor pool may not always increase monotonically because, during high inflation periods, it may be necessary to convert a high number of reserve tokens into digital coins, and the reserve pool may be insufficient. In this case, the remaining required reserve tokens will be taken from the investor pool.

At step 112 investors who own security tokens can receive payments from the investor pool. In some embodiments, the investors can receive periodic dividends based on an amount of shares of the tokens that the investors own and the amount of reserve tokens available in the investor pool. For example, at the end of each fiscal quarter, each investor will be paid a percentage of the reserve tokens in the investor pool corresponding to the percentage of shares, of all available shares, owned for the digital tokens. In some embodiments, payments to investors can be performed by converting reserve tokens into ETH or fiat currency proportionally to the amount of security tokens that each investor holds. At step 114 investors can elect to exchange reserve tokens received as dividends (in step 112) for fiat currency or buy more security tokens for increased dividends by trading on an exchange.

In operation, the system 200 can be used by some combination of actors or agents can be participants within the process 200. In some embodiments, the actors can include developers, miners, end users, investors, and bankers. The developer can be a service provider, such as for example, a multimedia streaming service provider (e.g., broadcasters), as discussed with respect to U.S. Patent Application Nos. 62/535,263, to which U.S. Pat. No. 11,425, 113 claims priority, and Ser. No. 15/954,473, now U.S. Pat. No. 10,848,553 incorporated herein by reference in their entirety. The miner (e.g., node users) can be an intermediary contributing computational resources to the developer to deliver services to end users. For example, the miners can relay a multimedia stream from a developer to subscribing end user devices. In some embodiments, the miner can be compensated, by the developer, in utility tokens for the computational resources provided. The end users can be users paying for the service provided by the developer and received via the miner, such as for example, a subscriber to a multimedia streaming service to receive multimedia streams. In some embodiments, the end users can pay, the developer, for the multimedia streaming services in digital coins or other fiat currency. The investor and banker can be actors that buy and sell reserve tokens for the digital coins over an exchange or other market. The investors can buy shares of reserve tokens through the exchange in the form of security tokens and receive periodic dividends based on their shares. The bank can manage the exchange of reserve tokens between investors and make digital coins available to developers for use as compensation as utility tokens to other actors (e.g., miners).

During operation, the stabilization of the digital token can fluctuate between stable periods, deflation periods, and inflation periods. During stable periods, the value of the digital coins is stable (e.g., digital coins $1 USD), such that no change to the market cap of digital coins is necessary. As new digital coins transactions are being generated, each transaction can cause a certain amount of reserve tokens to be minted or converted from utility tokens to reserve tokens, thus, adjusting the market cap value for the digital coins (e.g., step 110). For example, as depicted in FIG. 2, 100% of the utility tokens paid to miners will be minted as reserve tokens. The minted reserve tokens will be stored in the reserve pool if it is not full, otherwise, reserve tokens will be stored in the investor pool. The tokens stored in the investor pool will accumulate for two predetermined periods of time (e.g., quarters), and at the end of a second period of time, the tokens accumulated in the first period of time will be paid out to investors proportionally to their shares (e.g., step 112). The number of shares can be based on the total number of security tokens held by the investor.

During a deflation period, the price of digital coins will tend to decrease over time (e.g., digital coins <$1 USD). To counteract the decreasing value, it may be necessary to lower the market cap of the digital coins. In some embodiments, increased digital coin values can be achieved by converting utility tokens into reserve tokens instead of minting them (e.g., at step 104). In some embodiments, a smart contract can be used to calculate the current valuation of digital coins and then force the conversion process accordingly. The exact amount of tokens that will need to be converted will depend on the deflation rate. The higher the number of transactions occurring, the lower the percentage of tokens for each transaction that needs to be converted into reserve tokens. This is important because if the overall number of transaction is low, and 100% of the tokens of a transaction needs to be converted, then the miners would not earn any utility tokens.

During an inflation period the price of digital coins can increase over time (e.g., digital coins >$1 USD). To counteract the increasing value, it may be necessary to increase the market cap of the digital coins. In some embodiments, decreased digital coin values can be achieved by converting reserve tokens into utility tokens. In some embodiments, a smart contract can be used to continuously checks the value of digital coins against the predetermined fiat currency (e.g., USD). For example, once the value of one digital coins is above $1 USD then a certain amount of reserve tokens will be moved to the digital coins smart contract for conversion to utility tokens, and thus increase the supply of digital coins.

Figure 3:
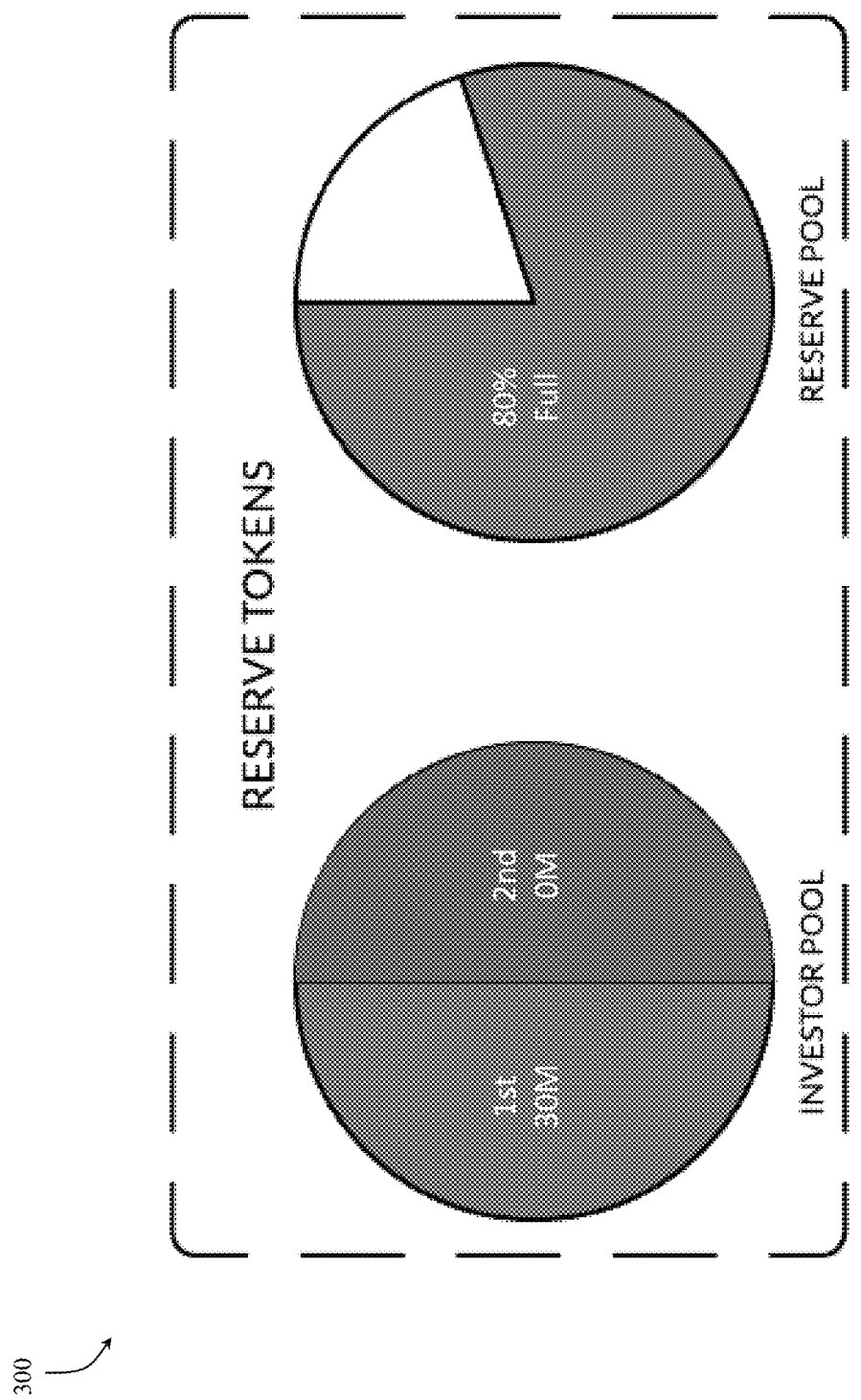
FIG. 3 is an example initial state of the reserve and investor pool, in accordance with the present invention.

Referring to FIG. 3, an exemplary example of an initial state of the reserve pool and the investor pool is provided. In particular, FIG. 3 shows the initial state of the reserve pool and investor pool at the beginning of a stable period. A stable period can be beneficial for all actors within the network (e.g., network 200). For example, a stable digital coin value will allow developers to reliably estimate how much they are spending to deliver services to end users, and similarly allow miners to reliably estimate how much they will earn in exchange for computational resources contributed to delivering said services. The reliable estimates are possible because the value should be consistent, eliminating one unknown variable when providing estimates. Similarly, with a stable token it is easier for a miner to more accurately establish the price for contributed resources (e.g., Gbps of bandwidth), and thus guarantee a positive return. In contrast, with an unstable token, miners may need to ask for a higher price for contributed resources to account for possible losses generated by the possible abrupt devaluation of the digital coin. A stable token also guarantees that miners receive 100% of the digital coins for a given transaction, whereas during periods of inflation or deflation this may not be the case. Therefore, during a stable period there is no incentive for any of the participating actors to change the stabilization.

In some embodiments, the investor pool can be divided into two portions corresponding to two periods of time. In the example depicted in FIG. 3, with respect to the investor pool, the first portion (e.g., period of time) has 30 million reserve tokens and the second portion (e.g., period of time) has 0 reserve tokens. In some embodiments, the first portion can be locked with new reserve tokens being added only to the second portion (when the reserve pool is full). FIG. 3 also shows that the reserve pool is 80% full for the predetermined quantity of reserve tokens. As discussed above, if the reserve pool is less than 100% then reserve tokens may not deposited into the investor pool and may be borrowed from, which would correspond to the second portion of the investor pool (e.g., the second period of time).

Continuing with FIG. 3, the depicted investor pool represents an example of the investor pool at the beginning of a new fiscal period (e.g., quarter). As discussed herein, in some embodiments, at the end of a fiscal period, the reserve tokens in the first portion of the investor pool will be paid out to investors and the reserve tokens in the second portion will be transferred (e.g., the reserve tokens generated in the previous fiscal period) into the first portion until the next fiscal period ends. Therefore, at the beginning of a new fiscal period, the second portion will be empty (e.g., 0%). The reserve pool is not full yet, and thus as new transactions are generated by the users of the system 10, the reserve pool will start to fill while the investor pool will remain unchanged. Once the reserve pool is 100% full, every newly minted reserve token will be transferred to the second portion of the investor pool. In a stable period, the investor pool will continue to fill at the maximum rate over time, and thus allow the investors to maximize their dividends in each quarter.

In some embodiments, when a deflation period occurs (e.g., digital coin <$1 USD), steps can be initiated by the stabilizer 18 to stabilize the digital coin value. In particular, during a deflation period, a percentage of the utility tokens to be paid to miners 14 will be converted to reserve tokens. During a deflation period it may be preferable to generate an amount of reserve tokens equal to a predetermined amount (e.g., 10%) of the digital coins transactions but not all as minted reserve tokens, as done during a stable period. In some embodiments, the stabilizer 18 can determine a percentage of reserve tokens that should be minted and a percentage of the utility tokens should be converted into reserve tokens. For example, as depicted in FIG. 4B, the stabilizer 18 can determine that 5% of the amount of utility tokens in each transaction needs to be converted into reserve tokens then, in the following transactions only 5% of reserve tokens will be minted to total 10% new reserve tokens per transaction. Therefore, in this example, after a transaction (e.g., step 104), 5% utility tokens are converted to reserve tokens, 5% reserve tokens are minted, and only 95% of utility tokens are paid out to the miner(s) instead of the 100% received during stable or inflated periods. The greater the deflation rate, the smaller the value that the miners will receive, while the value of the digital coins are stabilized. In some embodiments, the percentage paid to the miners can be static and not adjust, regardless of the level of inflation or deflation of the coin value.

By converting utility tokens to reserve tokens and reducing the number of utility tokens or digital coins paid to miners, the total supply of digital coins will decrease and the value of the digital coins increases because the market cap will be automatically adjusted. The stabilization process may not be a onetime operation but can be performed continuously during a deflation period. This means that as the valuation of one digital coins gets closer to $1, the system will continue to recalculate the amount of utility tokens that need to be converted and the corresponding percentage for transaction. As before, the newly created reserve tokens will first fill the reserve pool and then the investor pool at the maximum rate. Therefore, during deflation periods investors will still be able to maximize their dividends.

Figure 4A:
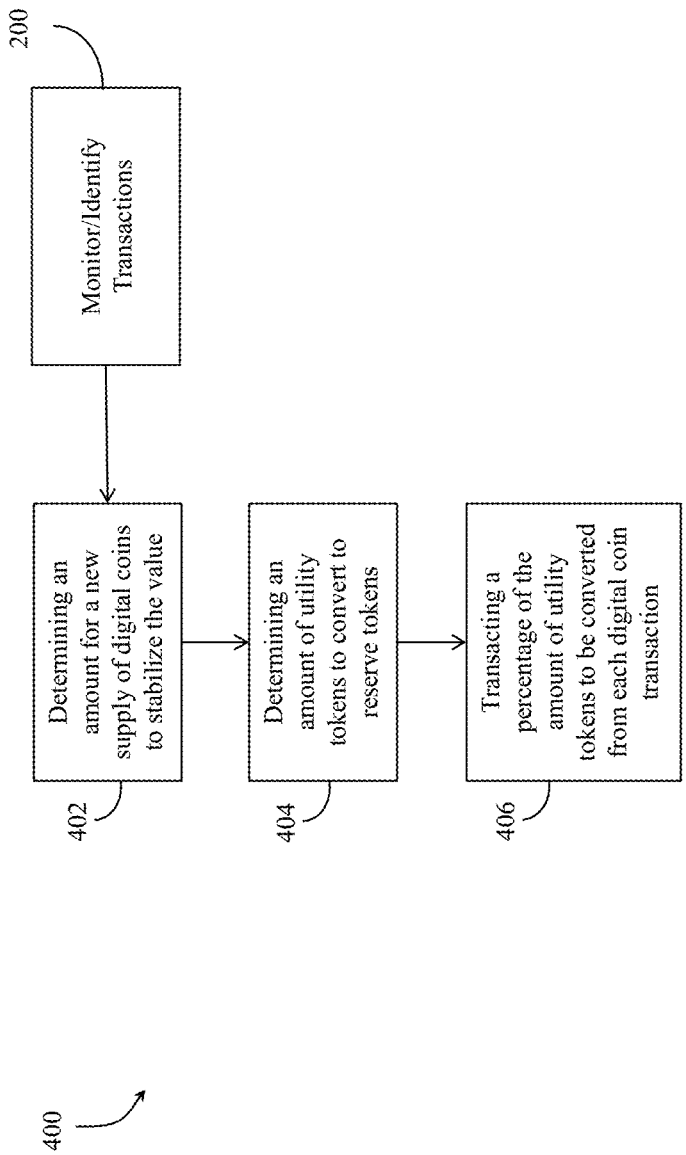
FIGS. 4A and 4B is an example process for adjusting digital coin value during a deflation period, in accordance with the present invention.
Figure 4B:
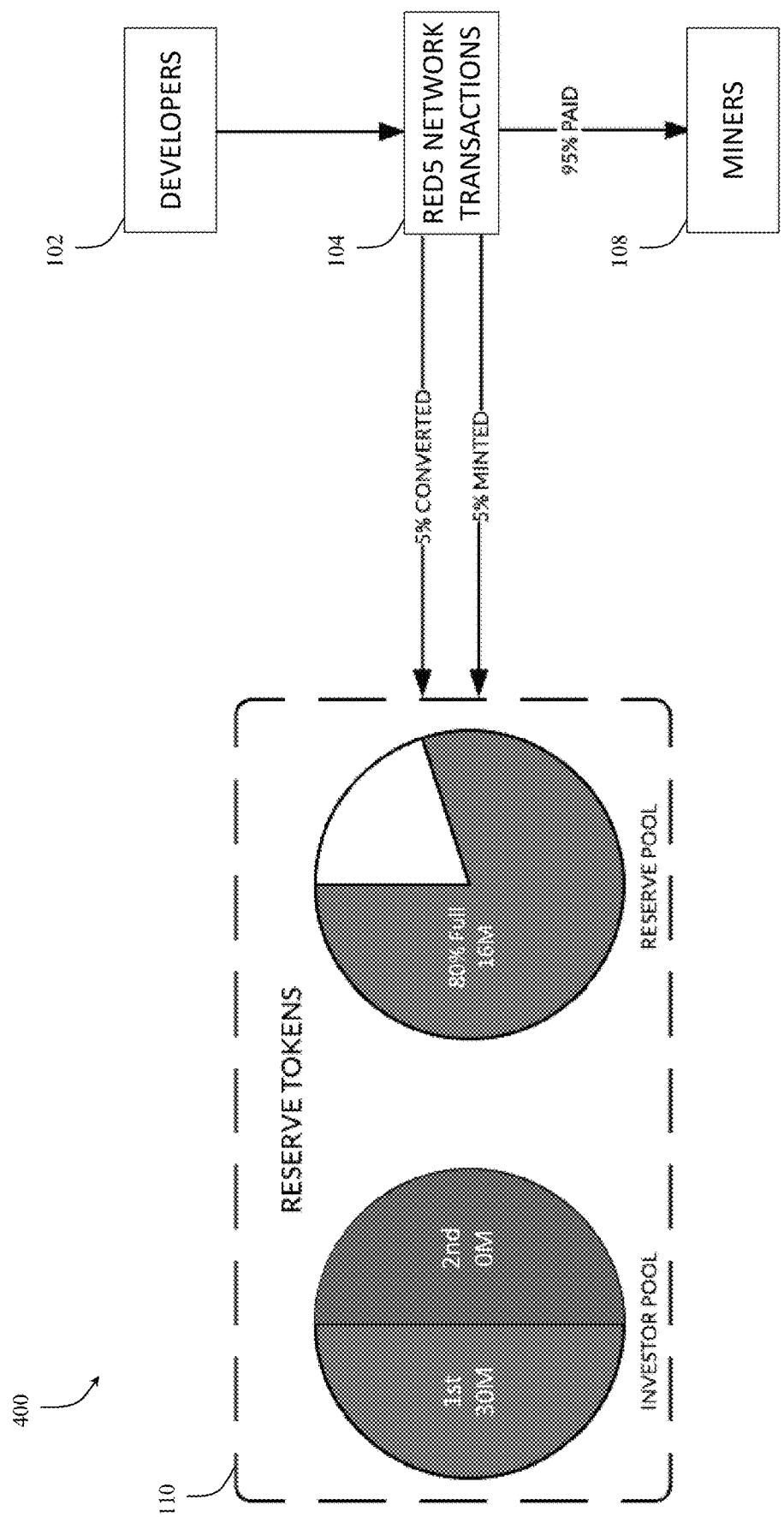

Referring to FIG. 4A, an example of a stabilization process 400 is provided. In this example, the initial state of process 200 includes an initial digital coins supply of 500 million and an initial market cap is equal to the 500 million multiplied by the fixed currency value of $1 USD to equal $500 million USD. During a deflation period the value of the digital coins drops to $0.9 USD and the current supply is X tokens to have a market cap of $0.9X. By monitoring the market value, a deflation period can be identified (e.g., by stabilizer 18) and a deflation period can be initiated. During this deflation period, system 200 will keep the value of digital coins stable by determining what should be the new supply of digital coins (e.g., to adjust the market cap to reflect a digital coin value of $1 USD) (STEP 402). If the market cap is assumed to be constant then the new supply will be equal to Y representing the market cap divided by the target value of $1 USD, and thus, Y is equal to $0.9X divided by $1 or $0.9X. Using the values for the initial state yields Y equals $0.9 multiplied by 500 million to equal 450 million. With the deflated market value Y the stabilizer 18 can determine an amount of digital coins to convert to stabilize the value (STEP 404). In this case, the conversation of utility tokens to reserve tokens would be equal to X minus Y. Thus, in this example, 500 million minus 450 million results in a conversion of 50 million utility tokens (over some period of time). This amount can be taken as a percentage from every utility token resulting from digital coins transactions until the value of the digital coin is stable again (e.g., equal to $1 USD) (STEP 406) or in a lump sum. When taking a percentage of the steps in process 400 can repeat itself until stabilization of the digital coin value is reached.

Based on the process 400, it is unlikely that the process 200 will stay in a deflation period for a long time because the price will be constantly adjusted and none of the actors participating within the process 200 would gain from this deflation period. Otherwise, some actor could try to trigger deflation and invest resources to avoid going back to a stable period. Instead, during a deflation period, the system 200 will tend to be used less because it will be less or not remunerative enough for at least the miner nodes. This in turn will lower the total number of transactions performed over this period, which will increase the amount of tokens that need to be converted into reserve tokens. Finally, this will decrease the earnings of miners even more and thus even less people will use system 10. Eventually, no transactions would be generated and the investors would not be able to receive any dividend. This shows that nobody has a long-term interest in staying in a deflation period.

Referring to FIG. 4B, FIG. 4B depicts example results of the stabilization process 400 during a period of deflation. In the example of FIG. 4B, the storage of reserve tokens within the investor pool and reserve pool, represent values during the start of a new fiscal period. In this example, the reserve pool has a total capacity of 20 million tokens and is 80% full. Since it's the beginning of the fiscal period, the investor pool contains 0 reserve tokens in the first portion (e.g., the current fiscal period) and 30 million reserve tokens in the first portion (e.g., the previous fiscal period) to be paid out to investors at the end of the current fiscal period. As shown in FIG. 4B, and as a result of the process 400 in FIG. 4A, at each transaction (step 104) 5% of the amount of the utility tokens for the transaction are minted as new reserve tokens, 5% of the utility tokens are converted to reserve tokens, and 95% of the utility tokens are paid out to the miners for contributions (step 108). Thereafter, the 10% of reserve tokens (minted and converted) can be added to the reserve pool. These values will adjust over time as the value of the digital coin are adjusted.

In some embodiments, when a inflation period occurs (e.g., digital coin >$1 USD), steps are initiated by the stabilizer 18 to stabilize the digital coin value. In particular, during an inflation period, a percentage of the reserve tokens in the reserve pool can be converted to utility tokens. During an inflation period it may be preferable to continue to mint new reserve tokens at the predetermined amount (e.g., 10%) for each of the digital coins transactions performed (e.g., step 104), as done during a stable period. During the inflation period, the miners will continue to earn 100% of the earned utility tokens for contributions. The stabilizer 18 can also determine a number of reserve tokens in the reserve pool to be converted to utility tokens to lower the value of the digital coins. Therefore, in this example, after a transaction (e.g., step 104), 44% reserve tokens are converted to utility tokens, 10% reserve tokens are minted, and only 100% of utility tokens are paid out to the miner(s). The greater the inflation rate, the larger number of reserve tokens from the reserve pool will be converted to utility tokens, while the value of the digital coins are stabilized. In some embodiments, when the reserve pool is empty, reserve tokens can be taken from the investor pool to be converted to utility tokens. In operation, the system uses the market cap to determine the new token supply and the difference with the current supply is the amount of tokens that need to be converted. This amount then can be calculated as a percentage of the reserve tokens. The reserve tokens can be burned after the conversion so they do not exist anymore, like they were transformed from reserve tokens to utility tokens.

Figure 5A:
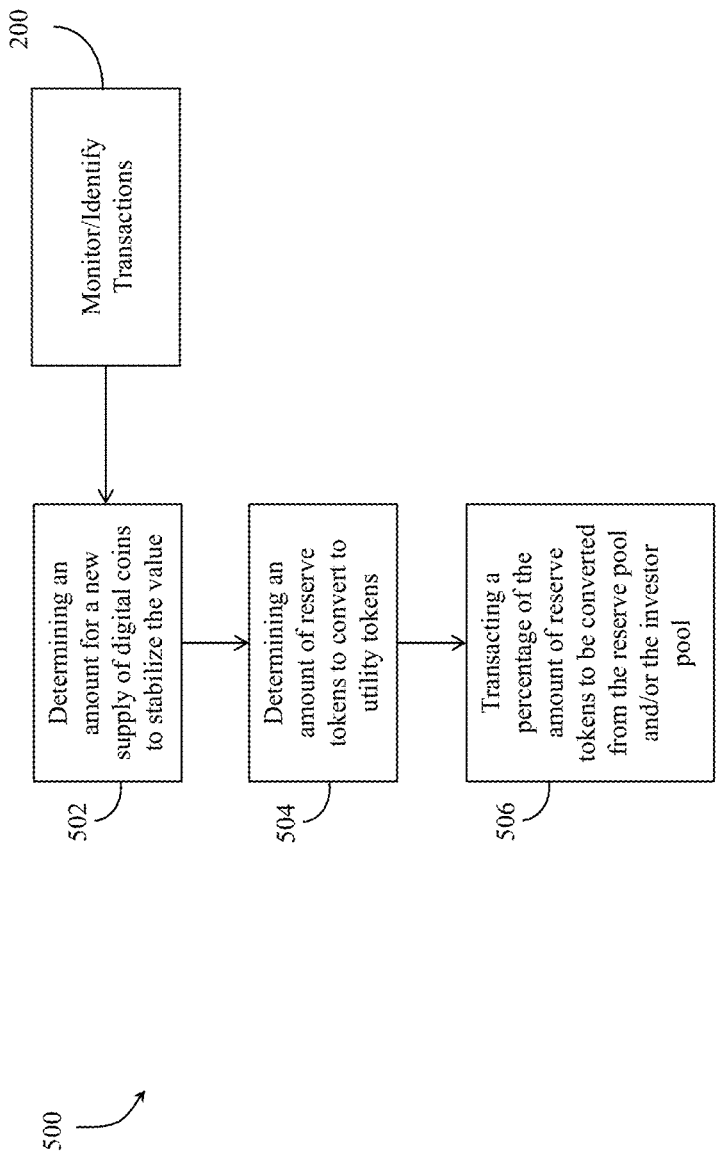
FIGS. 5A, 5B, and 5C is an example process for adjusting digital coin value during an inflation period, in accordance with the present invention.
Figure 5B:
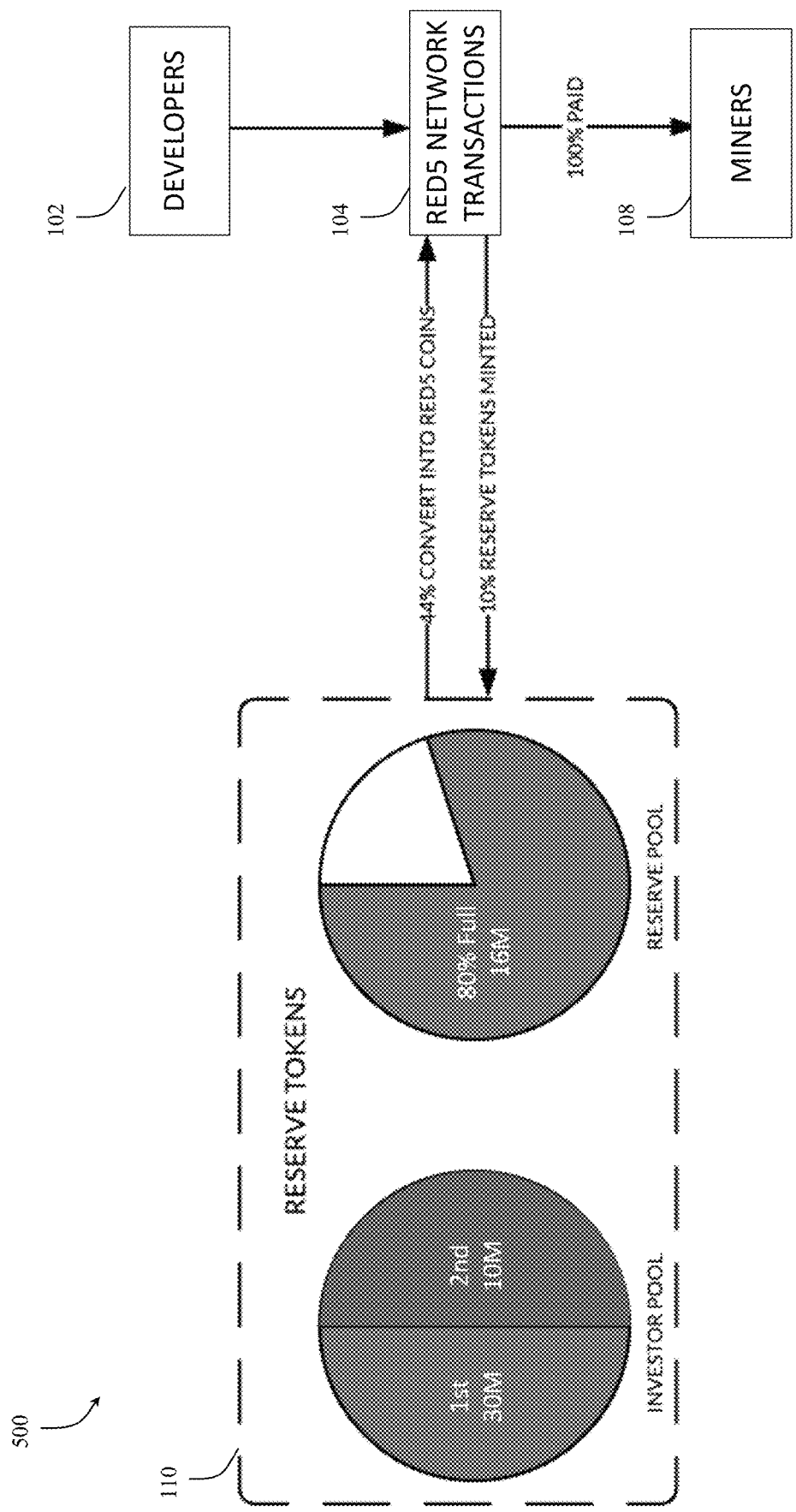

By converting reserve tokens to utility tokens and thus reducing the number of utility tokens purchased by developers, the total supply of digital coins will increase and the value of the digital tokens decreases because the market cap will be automatically adjusted, as shown in FIG. 5B. The stabilization process may not be a onetime operation but can be performed continuously during a inflation period. This means that as the valuation of one digital coins gets closer to $1, the system will continue to recalculate the amount of reserve tokens that need to be converted to utility tokens and the corresponding percentage for each digital coin transaction. Because it is possible the reserve tokens can be pulled from the investor pool, during inflation periods, investors may not be able to maximize their dividends.

Referring to FIG. 5A, an example of a stabilization process 500 is provided. In this example, the initial state of process 500 includes an initial digital coins supply of 500 million and an initial market cap is equal to the 500 million multiplied by the fixed currency value of $1 USD to equal $500 million USD. During an inflation period the value of the digital coins drops to $1. 05 USD and the current supply is X tokens to have a market cap of $1.0SX. By monitoring the market value, an inflation period can be identified (e.g., by stabilizer 18) and an inflation period can be initiated. During this inflation period, stabilizer 18 will keep the value of digital coins stable by determining what should be the new supply of digital coins (e.g., to adjust the market cap to reflect a digital coin value of $1 USD) (STEP 502). If the market cap is assumed to be constant then the new supply will be equal to Y representing the market cap divided by the target value of $1 USD, and thus, Y is equal to $1.0SX divided by $1 or $1.1x. Using the values for the initial state yields Y equals $1.05 multiplied by 500 million to equal 525 million. With the inflated market value Y, the stabilizer 18 can determine an amount of digital coins to convert to stabilize the value (STEP 504). In this case, the conversion of reserve tokens to utility tokens would be equal to Y minus X. Thus, in this example, 525 million minus 500 million resulting in a conversion of 25 million reserve tokens. This amount can be taken as a percentage from the reserve pool, or investor pool if necessary (STEP 506). The steps in process 500 can repeat itself until stabilization of the digital coin value is reached.

Figure 5C:
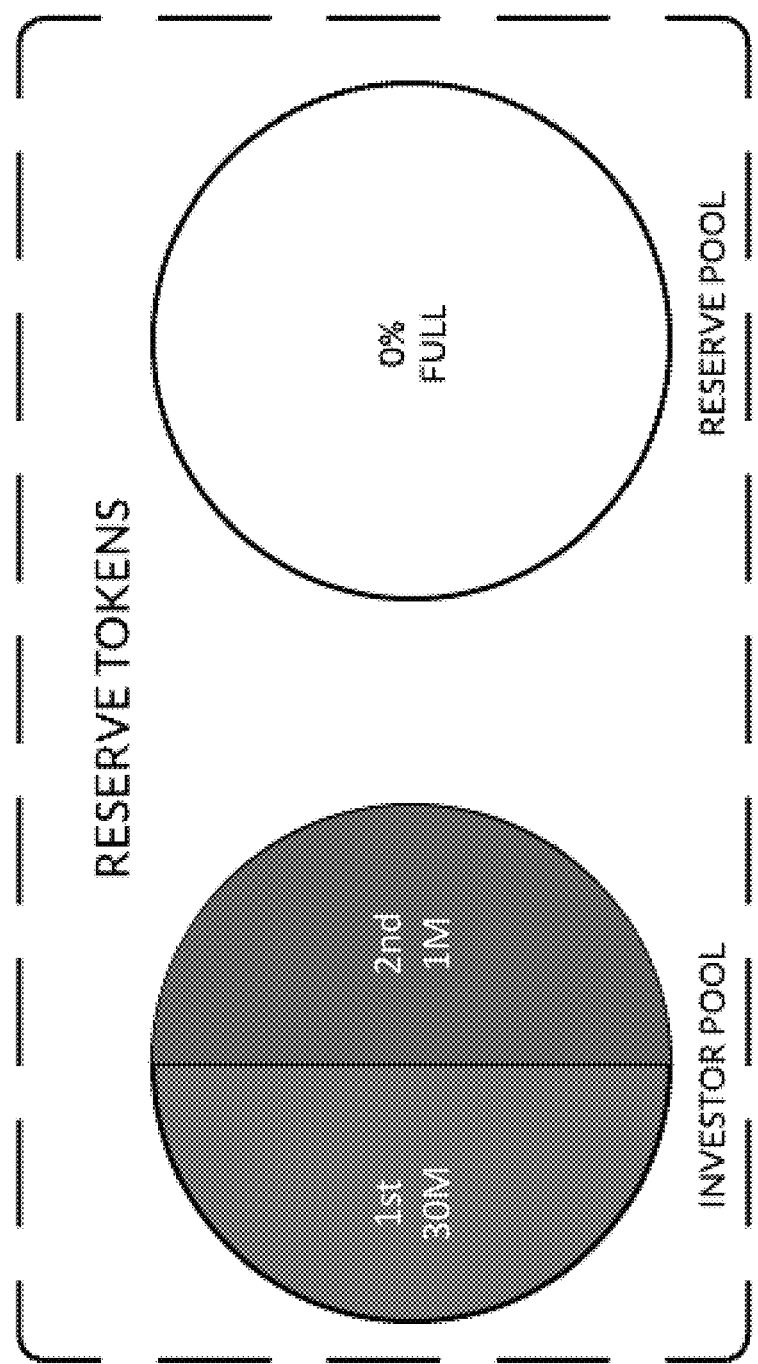

Referring to FIG. 5B, FIG. 5B depicts an example of the storage of reserve tokens within the investor pool and reserve pool, prior to an adjustment for inflation. In this example, the reserve pool has a total capacity of 20 million tokens and is 80% full with 16 million reserve tokens. The investor pool has a 30 million reserve tokens in a first portion and 10 million reserve tokens in a second portion. Continuing the example in FIG. 5A, 25 million reserve tokens will need to be converted into digital coins. As shown in FIG. 5B, and as a result of the process 400 in FIG. 5A, 44% (e.g., 25 million) of the reserve tokens are to be converted to utility tokens for the transaction and 100% of the earned utility tokens will be paid out to the miners for contributions (step 108). These values will adjust over time as the value of the digital coin are adjusted. Given the distribution of the reserve tokens in the respective pools, all the tokens in the reserve pool will be converted (16 million) together with 9 million reserve tokens taken from the second portion of the investor pool, totaling the required 25 million reserve tokens. FIG. 5C depicts the status of the reserve tokens in each of the investor pool and the reserve pool after the calculated reserve tokens have been converted to utility tokens during the inflation process 500. In particular, the reserve pool is empty and the second portion of the investor pool is left with only 1 million reserve tokens remaining. In this case, the amount of reserve tokens available was enough for the conversion, and therefore the system continued to generate new reserve tokens at the fixed 10% rate. Based on the process 500, the amount of digital coins available will increase and thus it is expected that their market cap will be lowered.

Figure 6A:
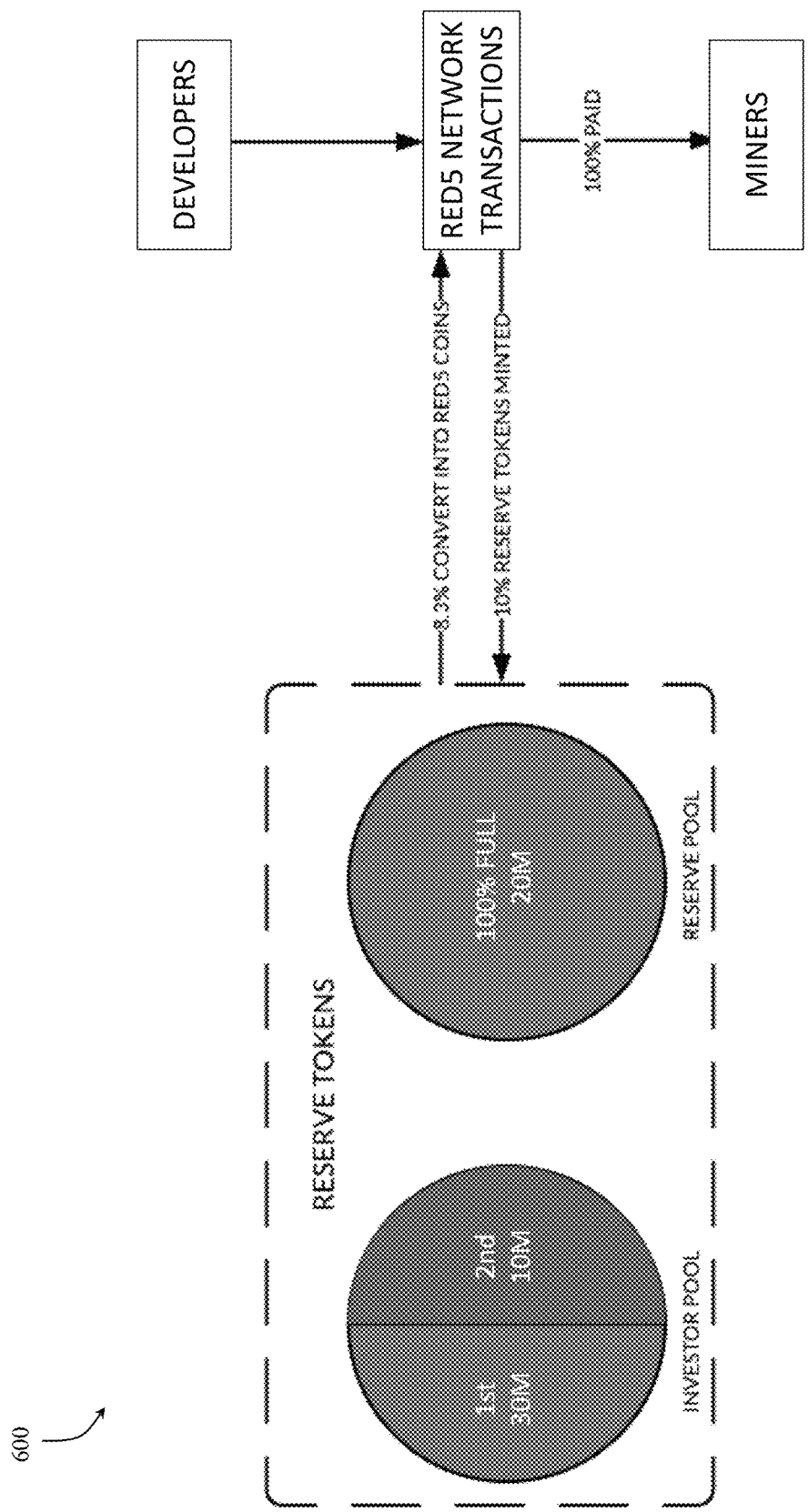
FIGS. 6A and 6B is an example process for adjusting digital coin value during an inflation period, in accordance with the present invention.
Figure 6B:
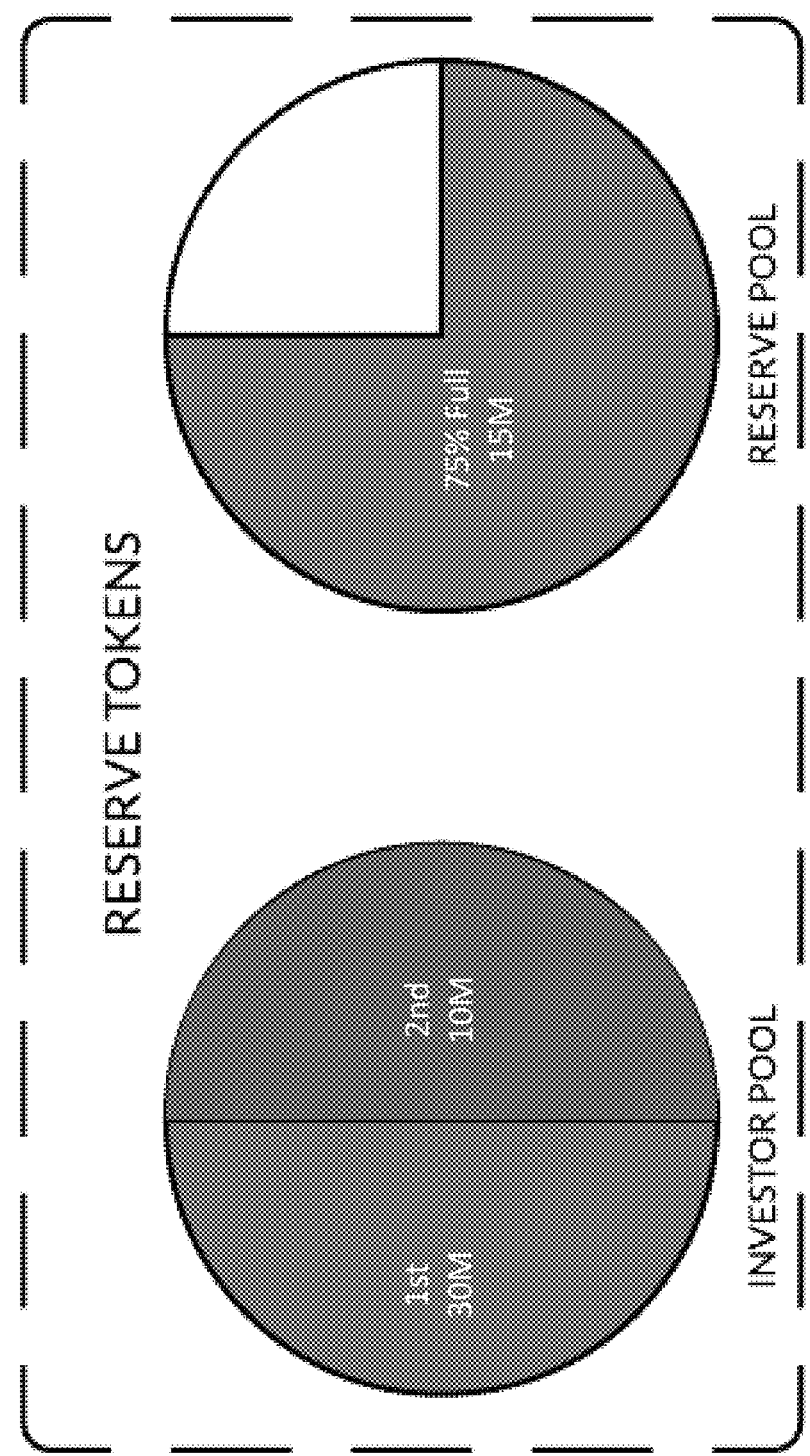

Referring to FIG. 6A, an example of a best-case scenario for an inflation period is provided. In this example, the initial state of process 600 includes an initial digital coins supply of 500 million and an initial market cap is equal to the 500 million multiplied by the fixed currency value of $1 USD to equal $500 million USD. The current valuation of the digital coins is $1.01 for a conversion amount of reserve tokens equal to 5 million (e.g., $1.01*500 million–$500 million=$5 million). This represents a best case scenario because, as depicted in FIG. 6A, there is a full reserve pool (with 20 million reserve tokens) and a large amount of reserve tokens is available in both portions of the investor pool, and the amount of inflation that needs to be corrected is limited (e.g., 5 million or 8.3% of reserve tokens to be converted). The reserve pool is full with a total of 20,000,000 tokens that are sufficient to provide the 5,000,000 tokens required to stabilize value of the digital coins. Thus, in this case, the investor pool will not be touched. It should be noticed that after the conversion the reserve pool will not be completely full. Therefore, the newly generated reserve tokens will be stored there at the standard 10% rate. FIG. 6B shows the distribution of the reserve tokens in the reserve pool after the conversion from FIG. 6A.

Figure 7:
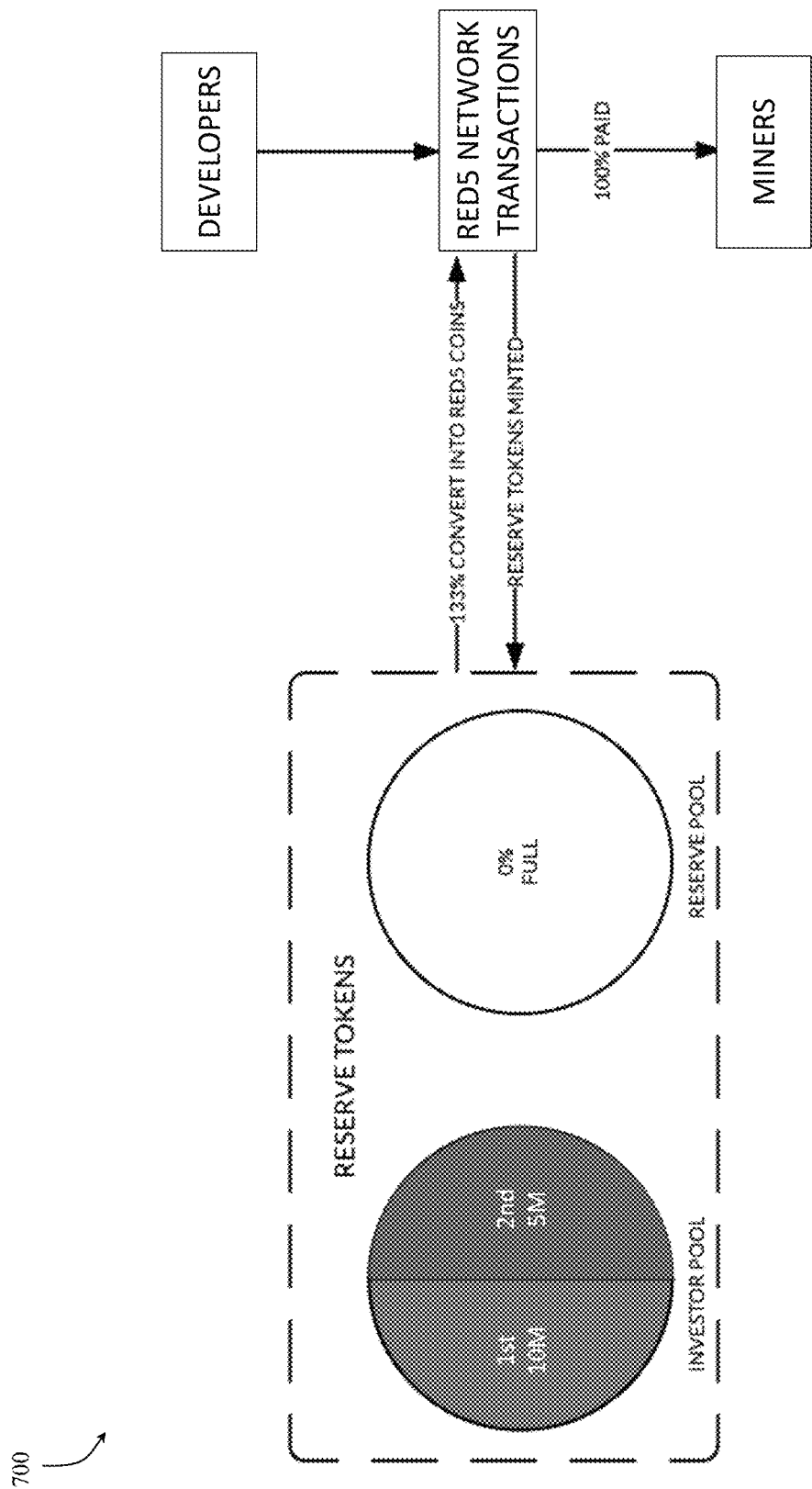
FIG. 7 is an example process for adjusting digital coin value during an inflation period, in accordance with the present invention.

Referring to FIG. 7, an example of a worst-case scenario for an inflation period is provided. In this example, the initial state of process 700 includes an initial digital coins supply of 500 million and an initial market cap is equal to the 500 million multiplied by the fixed currency value of $1 USD to equal $500 million USD. The current valuation of the digital coins is $1.04 for a conversion amount of reserve tokens equal to 20 million (e.g., $1.04*500 million–$500 million=$20 million). This can be considered a worst case scenario because the reserve pool is empty, the investor pool contains a limited amount of tokens and the total amount of reserve tokens is not sufficient to offset the inflated value of digital coins (e.g., 20 million reserve tokens, corresponding to 133% of the reserve tokens) as provided by the present invention. More specifically, based on the total amount of reserve tokens in FIG. 7 (e.g., 15 million) there is not enough reserve tokens in storage to stabilize the value of the digital coins. In this case, the system can convert the 15 million available reserve tokens available into utility tokens to reduce the inflation amount and then, as new digital coins transactions are generated, new reserve tokens are minted and immediately converted back into utility tokens to continue reducing the inflation.

In some embodiments, when there are insufficient reserve tokens to adjust inflation, the stabilizer 18 will need to calculate the new rate at which the reserve tokens should be minted to make the system stable again in a short interval. For example, the process can be analyzed through an example where 5 million new reserve tokens need to be converted. Assuming that there are 10 digital coins transactions per second (tps) that move on average, totally a total of 1 thousand digital coins per second and that if it is preferred to stabilize the digital coin value in approximately 50 seconds. Based on these values, the stabilizer 18 will calculate how many reserve tokens need to be minted for every digital coin transaction. To generate the 5 million remaining reserve tokens in 50 seconds, it would be necessary to generate 100 thousand reserve tokens per second. Thus, each digital coin transaction needs to generate 10 thousand reserve tokens (e.g., 100,000/10). It should be noted that this example is an extreme case because it assumes that the token value changes abruptly from $1 to $1.04 and thus the system needs to convert a big number of reserve tokens. In reality it is expected that the inflation value will change gradually over time such that such an abrupt adjustment would not be necessary. Moreover, as soon as a change is sensed system 200 will implement its procedure to stabilize the token thus requiring a smaller amount of reserve tokens.

In in instances when reserve tokens are taken from the investor pool, the earnings of the investors will be impacted. To make this unlikely to happen it is important to determine the correct size for the reserve pool. If the reserve pool is too small then tokens in the investor pool may need to be used too often and thus dividends could be impacted. On the other hand, if the reserve pool is too big, it may never be full or it could take a long time before it is full and this would impact negatively the dividends as well because only few tokens would be stored in the investor pool. A simulation has been used to determine the optimal size of the reserve pool. The results showed that having a reserve pool with size 5 thousand tokens allows the stabilizer 18 to balance values for the digital coins effectively, even when the investor pool is empty. At the same time, the simulation showed that the reserve pool fills quickly during the early stages of process 200 and then remains mostly full which implies that the impact on the investors' payout is minimal, as discussed in greater detail in the example simulation section.

In general, inflation periods should be very short because as soon as the stabilizer 18 senses that the value of a digital coin is not equal to $1 USD, it will start the process described above to stabilize the digital coin value. No actor participating in the process 200 would benefit from a long inflation period. The investors could receive smaller dividends and while miners 14 would continue to be paid with 100% of the transactions, if the inflation continues it would be necessary to continue to convert reserve tokens into utility tokens and their amount may not be sufficient considering the reserve tokens that are minted at every digital coins transaction and less developers would use system 200. That is because a higher digital coin price implies a higher barrier for developers to buy new digital coins. Moreover, the prices set by miners would increase as well because of the fear that the value of digital coins may decrease quite abruptly. This in turn, would lower the number of transactions and thus the earning of miners. Therefore, even in this case, no entity has an interest in staying in an inflation period.

The ability to effectively stabilize the value of digital coins depends also on their demand. In fact, to correct a deflation period it is necessary to have some digital coins transaction where a part of the utility tokens can be converted into reserve tokens. This may be necessary even during an inflation period if the amount of reserve tokens to convert into utility tokens is not enough. Therefore, the higher the demand of digital coins the higher the number of transactions. Events that can influence the demand are i) prices applied by miners, ii) usage by developers: demand will be high as long as developers will pay less to use system 200 than the alternatives (e.g., cloud platforms and CDNs) while having the same performance, iii) performance of the network and/or service: quality of service from developers to end users will increase or decrease the demand, and iv) popularity of the network: more new end users, developers, and miners participating in the system 200 will increase the number of transactions. All these factors together will contribute to increase demand and cause the value of digital coins stabilize, which in turn will guarantee a predictable income for miners and a predictable expense for developers.

In some embodiments, investors can be allowed to buy and trade security tokens associated with the digital coins. Security tokens can be minted in a fixed amount, each of them represents a share and they can be traded in exchanges. Security token holders, or investors, investing in security tokens may not have an effect on the stabilization of the utility token, instead, security token holders can receive dividend payouts as a passive participant within the stabilization system. For example, security tokens can provide investors the right to receive a quarterly dividend. The dividends will be divided proportionally to the amount of security tokens or shares owned by each investor. The amount of dividends generated by process 200 depends on the number of digital coins transactions performed over a given period of time. As discussed herein, each digital coin transaction generates a certain amount of reserve tokens that can be stored in the investor pool, after the reserve pool is full. As discussed previously, the investor pool can store reserve tokens in two predetermined periods (e.g., fiscal quarters) and at the end of each predetermined period, the reserve tokens of the previous predetermined period can be paid out while still guaranteeing a reserve token supply in case of an extreme inflation period. As would be appreciated by one skilled in the art, during the initial startup of the process 200, the first-time investors will need to wait two predetermined periods to receive their dividends, while after that they will be paid at every predetermined period. The pay out to investors consists in converting reserve tokens into Ethereum or fiat money. The reserve tokens converted in this way will be burnt and removed from the calculation of the market cap.

EXAMPLE—SIMULATOR

A simulation of the processes of the present invention and simulation results are provided herein. The simulation and results are provided for exemplary purposes and are not intended to limit the scope of the present invention. The discussion provided herein relates to the stabilization of the value of digital coins has been evaluated through a computer simulation. The focus was on proving that this design effectively pegs one digital coins to $1 USD and it is able to respond efficiently to inflation and deflation periods. Investors have been considered as well by simulating quarterly payout to security token holders.

The simulator has been created by modifying BazaarBot an existing actor-based free market simulator engine. Its purpose is to simulate an economy where multiple actor can trade goods. Then, based on the demand and supply of each good, their change in price is simulated. Moreover, the profits of every actor are simulated as well. BazaarBot proved to be a very good starting point because it allowed us to simulate the change in price of digital coins. The main changes to the existing simulator consisted of creating new actor, developing the logic that they had to follow to trade digital coins and modifying the system of beliefs that each actor has.

The simulation consists of multiple rounds. In each round, a certain number of developers are delivering some video streams through some miners elected randomly to some end users. Each round represents a day with 30 days representing a month. The results obtained in a round become the starting conditions for the next round. This makes it possible to simulate the behavior of the system over a period of months or years. Moreover, every quarter or three months the reserve tokens in the investor pool are paid out to simulate the earnings of the security token holders.

Developers are the entities that buy digital coins from the market and transfer them to the miners that are delivering their video streams. Developers start with a certain amount of USD and digital coins in their accounts so they are ready to both stream and buy digital coins. The number of developers changes at each round of the simulation based on the starting conditions of the system. Those conditions specify the number of monthly developers and their average number of video streams and viewers. The simulation is run for each day in a month, and therefore the daily number of developers is equal to the number of monthly developers divided by the number of days in a month, which for simplicity is assumed to always be 30. Then, for each day, each of these developers will pay to the miners an amount of digital coins (e.g., utility tokens) equal to the one required to deliver a number of video streams to a number of users specified in the starting conditions. Each video stream is assumed to be a 1 Mbs video and last one hour. When the system is stable or under an inflation period an amount of reserve tokens equal to the amount of digital coins transacted is generated and put inside the reserve pool if not full, otherwise it is moved to the investor pool. On the other hand, during a deflation period the reserve tokens are generated as before, but in this case 10% of the digital coins transacted are removed from the market to help lower their price.

When developers buy digital coins from the market they are spending some USD from their account. To simulate the profit of the developers it is necessary to simulate the earnings that are generated by the fact that some people are viewing their video streams. This source of revenue could come from advertisement, a subscription service, or a pay per view monetization strategy, and so on. These earnings are simulated as follows:

A random number n is drawn from the interval [−25,75]
The bank account of the developer is increased by an amount:

$$a = (\$1 + n/100) * red5coins\_sent\_to\_miners$$

In this way, based on the random value n, the developer will either have an earning or a loss.

Miners are the actors that deliver the video streams. As such, they receive utility tokens from the developers in exchange for providing computational resources to the developer. Miners can try to sell them on the market to earn USD. The number of miners in the simulation has been fixed to 3000. Similarly, for the developers, the profits of the miners are simulated as well. This implies that the simulation needs to predict the expenses that the miners experience when delivering a certain number of streams to a certain number of users. These predictions have been calculated by using Amazon Web Services (AWS) as a starting point. The AWS calculator has been used to calculate the cost of delivering a video stream with bandwidth 1 Mbs for one hour using a C5.large EC2 instance. The price turned out to be p=$0.33. Given that this is the price applied by AWS to consumers it is expected that miners will have a lower expense than that to deliver the video stream. The actual number will depend on their infrastructure and scale. The price p is configurable in the simulation and different values have been used to see the outcomes. The value is used by developers to determine how many tokens they need to send to the miners. The process works as follows:

The price p is used to determine the actual expenses of the miner given how many streams and users it is serving A random number n is drawn from the interval [10,30]
The miner receives an amount of tokens equal to:

$$a = miner\_expenses * (\$1 + n/100)/current\_red5coin\_price$$

In this way, miners are always trying to maintain a profit between 10-30%. Then, the actual profit will be determined when the miners will sell their tokens on the market.

The main role of the bank actor (or stabilizer) is to keep the value of digital coins equal to $1 USD. The bank does that by calculating the new supply of digital coins that needs to be put into the market to lower or increase the value of digital coins. The supply is dictated by the miners and the bank. The demand on the other hand is dictated by the developers. At each round of the simulation the bank knows the current value and supply of digital coins and the amount of digital coins that the bank offered in the previous round. In this way, the bank can calculate the new supply as well as the amount of digital coins that were offered by miners in the previous round. By assuming that such an amount will not change, the bank is able to calculate how many tokens it needs to offer. During an inflation period the bank will convert reserve tokens into utility tokens, and thus it will always make a sell offer. On the other hand, during a deflation period the bank may need to offer no tokens to lower their supply and increase the digital coins value. In fact, if miners are creating a supply of 500 tokens, and the bank calculates that the overall new supply needs to be 400 tokens, then the bank will not offer any utility tokens as the miners are already offering more than required. In the last situation depicted, the bank will also try to buy existing digital coins from the market in order to lower their supply. This corresponds to the digital coins smart contract fulfilling sell requests in the real system documented earlier.

In operation, the original simulation uses a system of beliefs to let actor choose how much they want to offer or pay for digital coins. These beliefs reflect how much an actor thinks a digital coins is valued. When an actor wants to sell digital coins, it needs to create an offer for a certain amount of digital coins for a certain price that depends on its beliefs. Similarly, an actor that wants to purchase makes a buy offer. The sell and buy offers are then matched by the simulator and the clearing price is used to update the beliefs of the two actors. This system of beliefs was slightly modified. As previously discussed, every actor in the system has an interest in making digital coins have a stable value as that maximizes everyone's returns. This suggests that actor will try to sell and buy digital coins by using a value of $1 USD because they believe that that is its correct value. Therefore, they will have a belief that $1 USD is the correct digital coins value. To reflect this observation into the simulation the beliefs are updated as follows: i) If the offer created by actor is matched to another actor's offer then the beliefs of those actor are set to $1 USD and ii) If the offer is not matched then the beliefs are calculated as in the original simulation, and thus may be higher or lower than $1 USD This asymmetric approach has been chosen to keep some randomness in the belief system and to see whether the system is stable even though not every actor believes the value of digital coins will become $1 USD again.

Simulation Results

In this section the results of the simulation are reported. The following sections will explain the data that has been used as input and report the results obtained by running the simulator under different scenarios.

Figure 8:
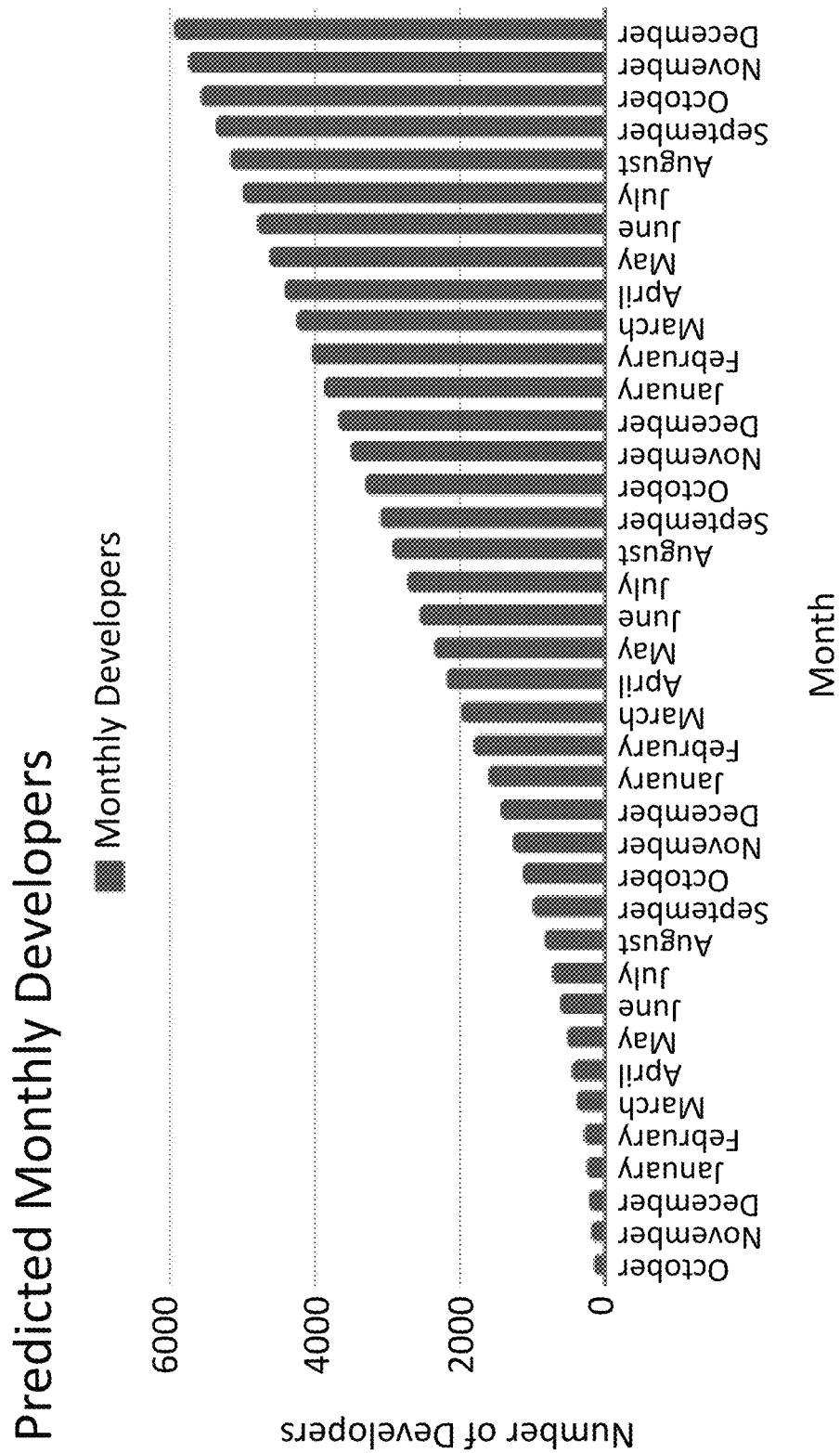
FIG. 8 is an example of monthly input during a simulation, in accordance with the present invention.

The input data has been generated to cover a period of about three years. In particular, the data points simulate a growth in the number of developers and viewers of the video streams in order to evaluate the response of the system. The chart in FIG. 8 shows the number of monthly developers that has been used in the simulation. Considering that a round of the simulation is run for every day of a month, then the number of daily developers in a certain month is equal to the monthly developers divided by thirty. The number of miners has been fixed to 3000, and the number of banks is set to one.

Figure 9:
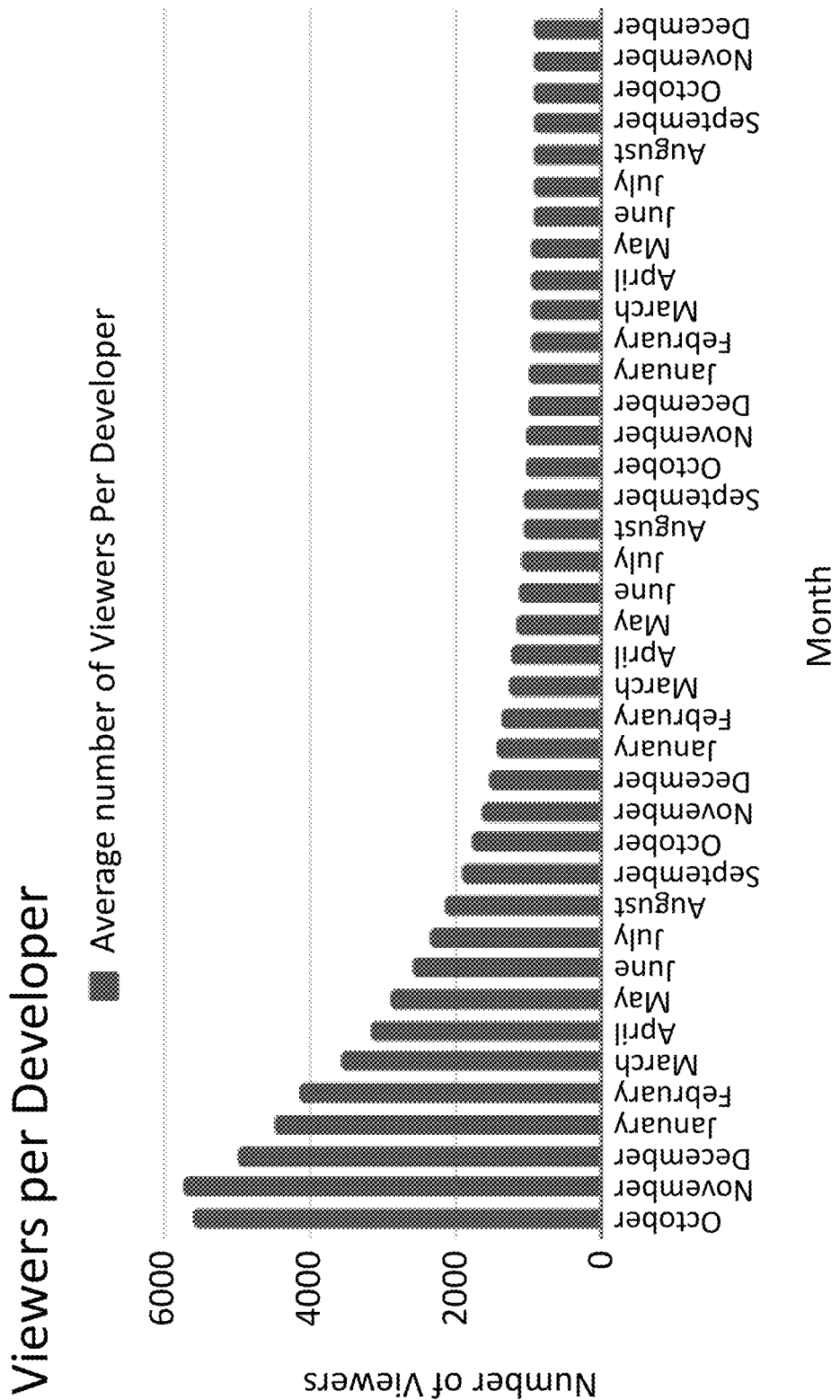
FIG. 9 is an example of a predicted number of viewers during a simulation, in accordance with the present invention.
Figure 10:
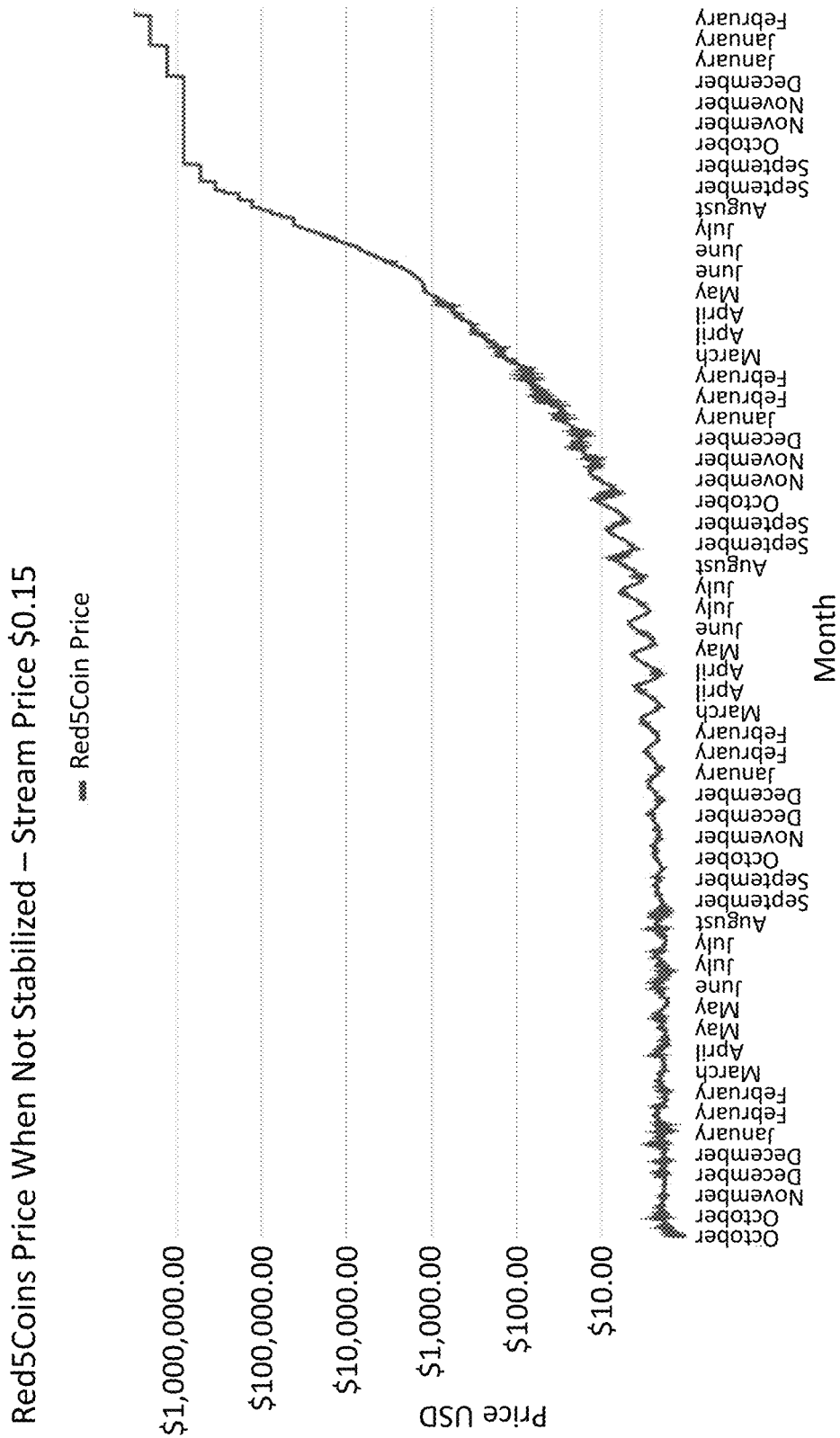
FIG. 10 is an example of no stabilizing action taken during a simulation.

FIG. 9 shows the prediction for the number of viewers that each developer will have in their video streams. It should be noted that this prediction shows a decreasing value because the growth rate of developers and viewers per stream is different. In other words, the number of developers is expected to grow much more than the number of viewers in each stream. Therefore, the ratio between the overall number of video stream viewers and the number of developers will decrease. These predicted values are used in the simulation to determine how many people are watching a video stream for each developer, and consequently how much money a developer needs to pay miners.

The simulator also accepts a starting value for the number of tokens in the reserve pool and a maximum size of it. The initial reserve pool tokens are needed to allow the system to stabilize digital coins in the initial stage. In fact, in the first round of the simulation the system has no idea about what the demand and supply of digital coins will be, and thus the digital coins price will not be stable right away, It will need some iterations in order to stabalize. The maximum size of the reserve pool represents how many tokens it can hold, and it impacts the time when the investor pool will be able to start to fill up. Both these values have been set to 5,000 tokens.

The next input is the stream price per miner. This price represents how much a miner needs to spend to deliver a single video stream, which is assumed to have bandwidth of 1 Mbs and be running for a length of one hour. An upper bound for this price has been calculated with AWS and it turned out to be $0.33. This price influences how much money the miners will ask of the developers to deliver the video stream.

The last input conditions are related to the actor. Each of them needs to start with a certain amount of money and digital coins in their accounts: i) Developers: They have been configured to have $10,000 in their account and 1,000 digital coins. Moreover, they are pushed to buy more digital coins as long as they have some money in their account and have less than 3,000 digital coins, ii) Miners: They have been configured to have $10,000 in their account and 0 digital coins. As soon as they earn digital coins they will try to sell it on the market to earn USD, and iii) Bank: It has been configured to have $1,000,000 in its account to be able to buy tokens from the market if needed. Moreover, the bank is configured with 5,000,000 digital coins representing the maximum supply of tokens in the system. The simulation was run with 5,000,000 to make it faster. It should be noted, that the results are the same even as the number of digital coins increases. For example, the bank can be configured with 500,000,000 tokens and should yield similar results as the simulation involving 5,000,000 tokens. That is because, a higher number of tokens only allows the bank to sell to more developers. On the other hand, the stabilization of digital coins is not impacted because it's efficacy depends mostly on the size of the reserve pool.

Two different simulations have been run to show the effects of the reserve tokens in the stabilization of digital coins. The results of the first simulations can be seen in FIG. 10. These results show the effects of not having any mechanism to stabilize the price of digital coins. That is, reserve tokens were ignored. It can be noticed that in the initial months the price of digital coins is somewhat constant but with considerable variations. After one year and a half the price starts to increase super exponentially until reaching a limit.

Figure 11:
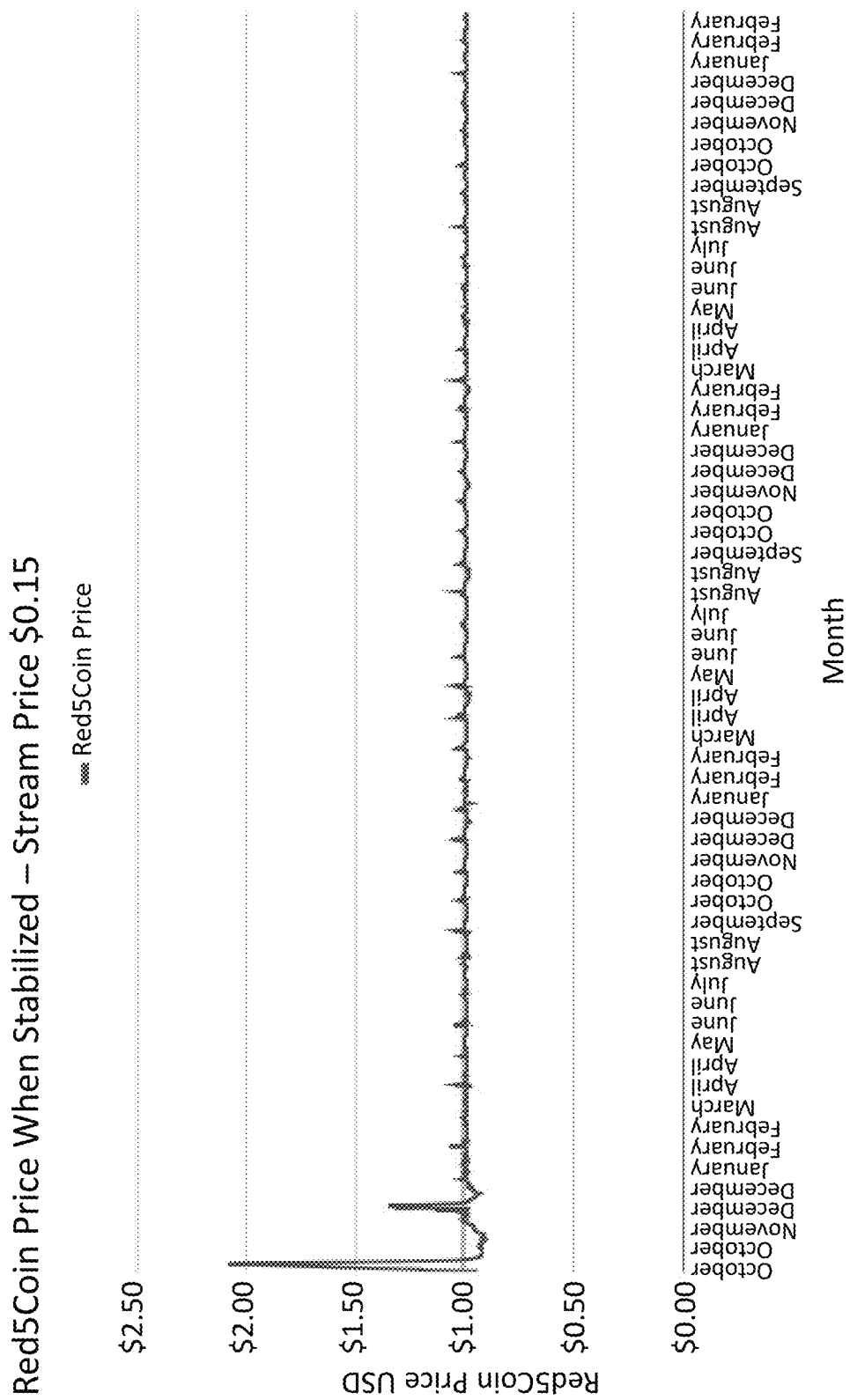
FIG. 11 is an example of stabilizing action taken during a simulation, in accordance with the present invention.

FIG. 11 shows the results obtained when the reserve tokens were used to stabilize the price of digital coins. It can be seen that besides some limited spikes most of the time the value of digital coins is very stable around 1 USD ±5%. The initial spikes are due to the fact that the simulation needs some rounds to stabilize the token. That's because as soon as the system is started, the bank does not know how much the demand and supply will be. Moreover, the demand changes considerably in the first iterations as more developers spend tokens and try to buy new ones. This causes, digital coins to have their price change considerably. During this period, the bank is using the initial reserve tokens to limit these spikes as much as possible and regulate the price of digital coins. A prefilled reserve pool with a capacity of 5,000 tokens is able to contain the initial spike and stabilize digital coins in about 15 rounds which represent 15 days. The second biggest spike is contained in about 15 rounds as well. After that, once the token has been stabilized it never experiences a change above ±5%.

Figure 12:
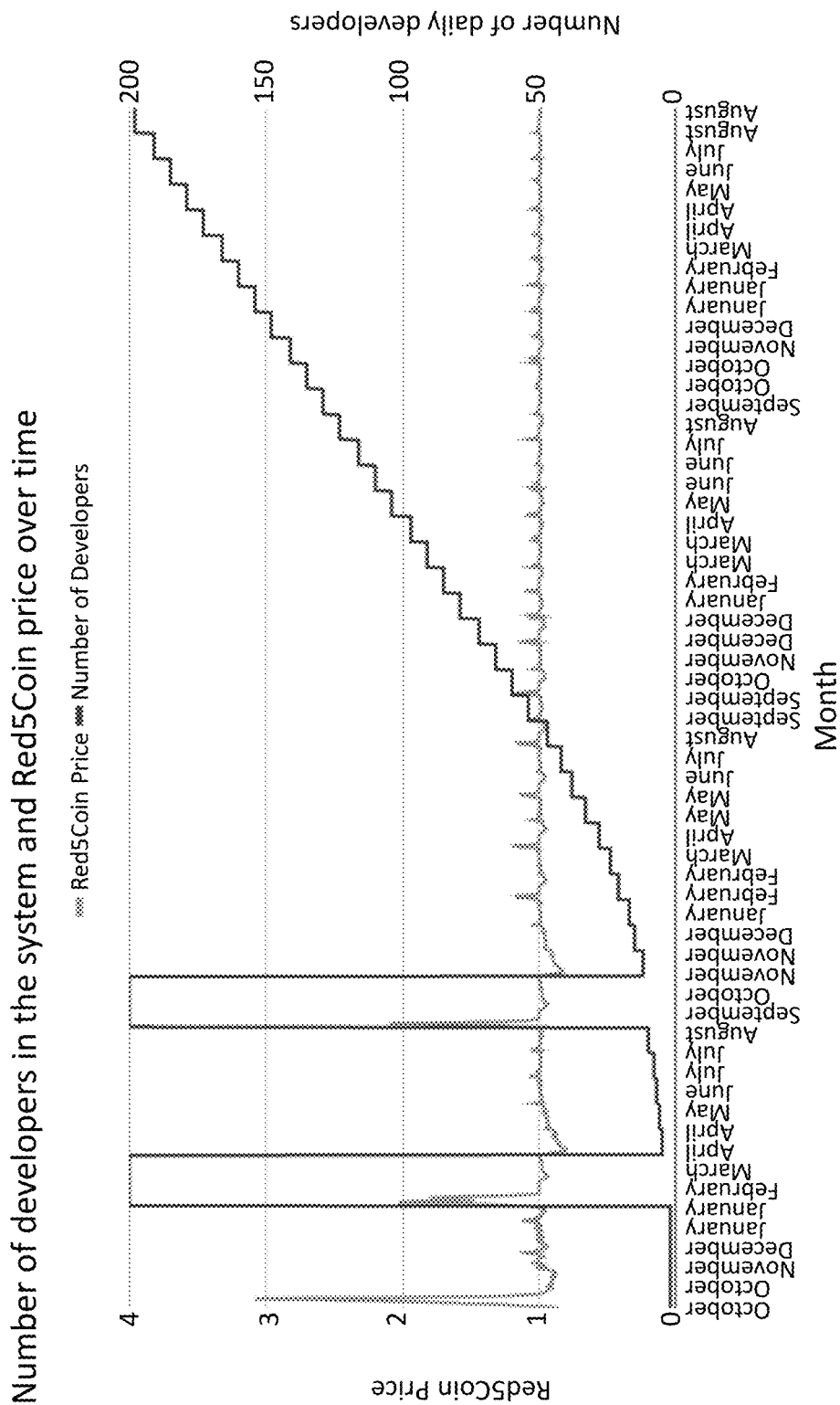
FIG. 12 is an example of a number of developers and digital coin price over time during a simulation, in accordance with the present invention.
Figure 13:
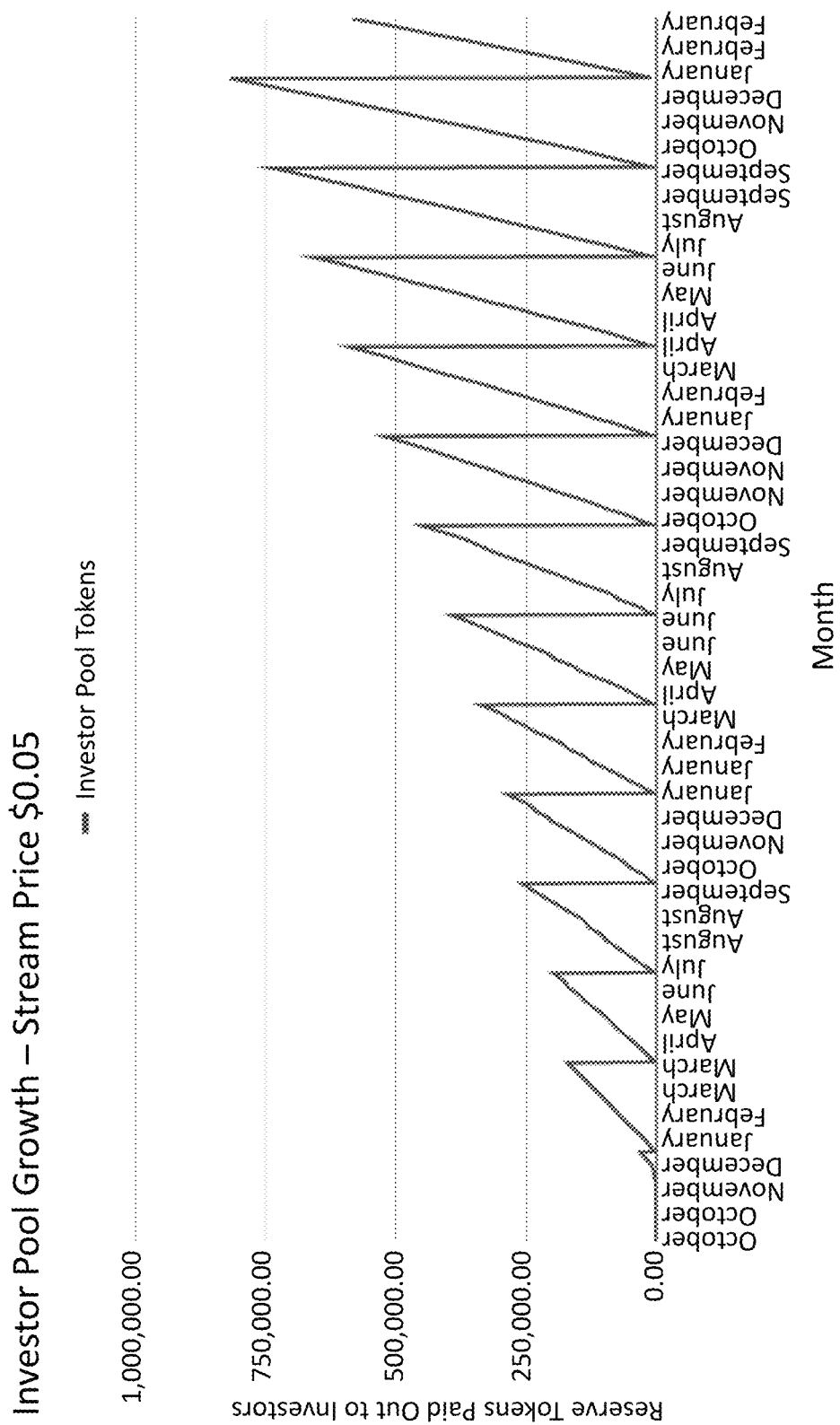
FIG. 13 is an example of a predicted growth of the investor pool during a simulation, in accordance with the present invention.

In the simulation, an inflation period was triggered, followed by a deflation one two times in a row and evaluate the response of the system. The results are shown in FIG. 12. The simulation consisted in starting the network with a small number of developers and video streams in order to allow the system to reach stability. After that, the number of daily developers was increased suddenly as well as the number of video streams. This created a big demand for digital coins, that given their limited supply, generated a spike in their price and thus triggered an inflation period. After that the number of developers was kept constant to see how long it would take for the system to stabilize. From the chart it can be seen that the highest value reached by digital coins is $2 and after that it returns back to $1 in about 5 rounds of the simulation. Therefore, the system responds quickly and it is able to stabilize digital coins. These results coupled with the fast response suggest that an inflation period is unlikely to reduce the demand of developers and make the network less popular.

The opposite was tested as well. To do so, the number of developers was decreased abruptly. This creates an oversupply situation that devalues digital coins. During the deflation period the number of developers was still kept low to see whether a limited number of transactions would limit the ability of the system to stabilize again. The results show that that is not the case. Contrary to the previous situation the system is slower in stabilizing but this slowness is compensated by the fact that the minimum value reached by digital coins is $0.87. These results suggest that even during a deflation period when the number of transactions in the system may be limited, the system is still able to stabilize while avoiding having digital coins lose all of its value. At the same time, the limited devaluation suggests that developers and miners are likely to continue to use the system as usual, and therefore the network will maintain its popularity.

Two different simulations have been run to show how the investor pool is predicted to grow over time. One simulation using a stream price per miner equal to $0.05 while the other simulation used a price of $0.15. The results for the first case are reported in FIG. 13. The chart shows how the investor pool grows over time and is emptied at the end of every quarter. It can be noticed that the investor pool is constantly growing at a constant rate. This suggests that the reserve pool is full and that the majority of the time is spent in a stable period. It can be noticed that the lines are not perfectly straight but have some small bumps. That implies that in those moments there must have a been a small inflation period that required the use of some reserve tokens, and thus emptied a part of the reserve pool. Subsequently the reserve tokens that were produced right after that were put in the reserve pool, thus preventing the investor pool from growing at a constant rate.

Figure 14:
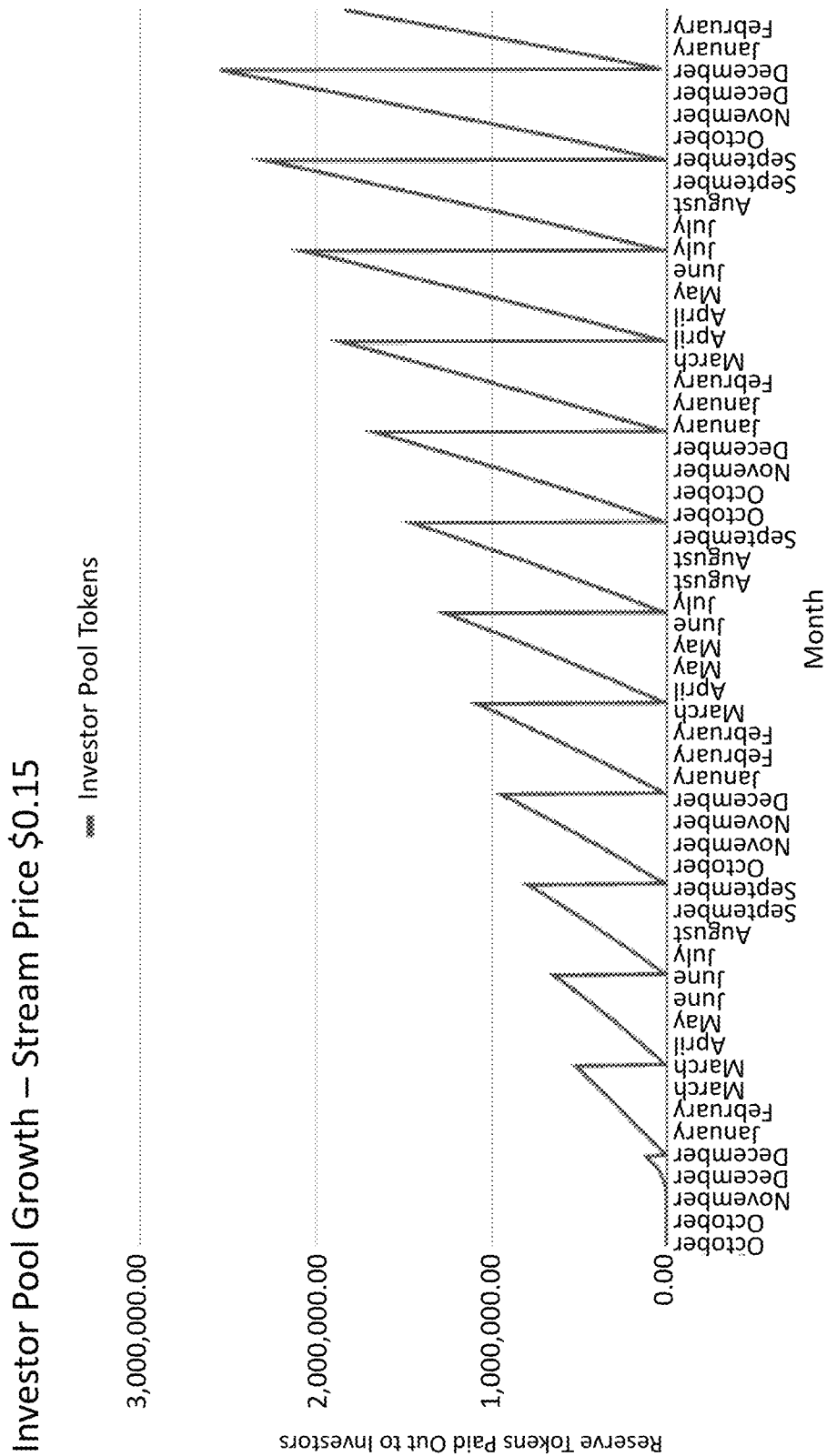
FIG. 14 is an example of a predicted growth of the investor pool during a simulation, in accordance with the present invention.

FIG. 14 shows the results for when the stream price is $0.15. The behavior is similar to the previous case with the only difference that a higher number of reserve tokens in paid out. This happens because even though the starting conditions are the same in both simulations, the amount of tokens paid to the miners is different and depends linearly on the stream price. Therefore, a higher volume of digital coins is transacted in the second simulation. This, in turn, implies a higher mint rate of reserve tokens as well. That is because, during a stable period, each digital coin transaction mints an equal amount of reserve tokens that are inserted into the reserve or investor pool, and this in turn increases the investors' payout.

Figure 15:
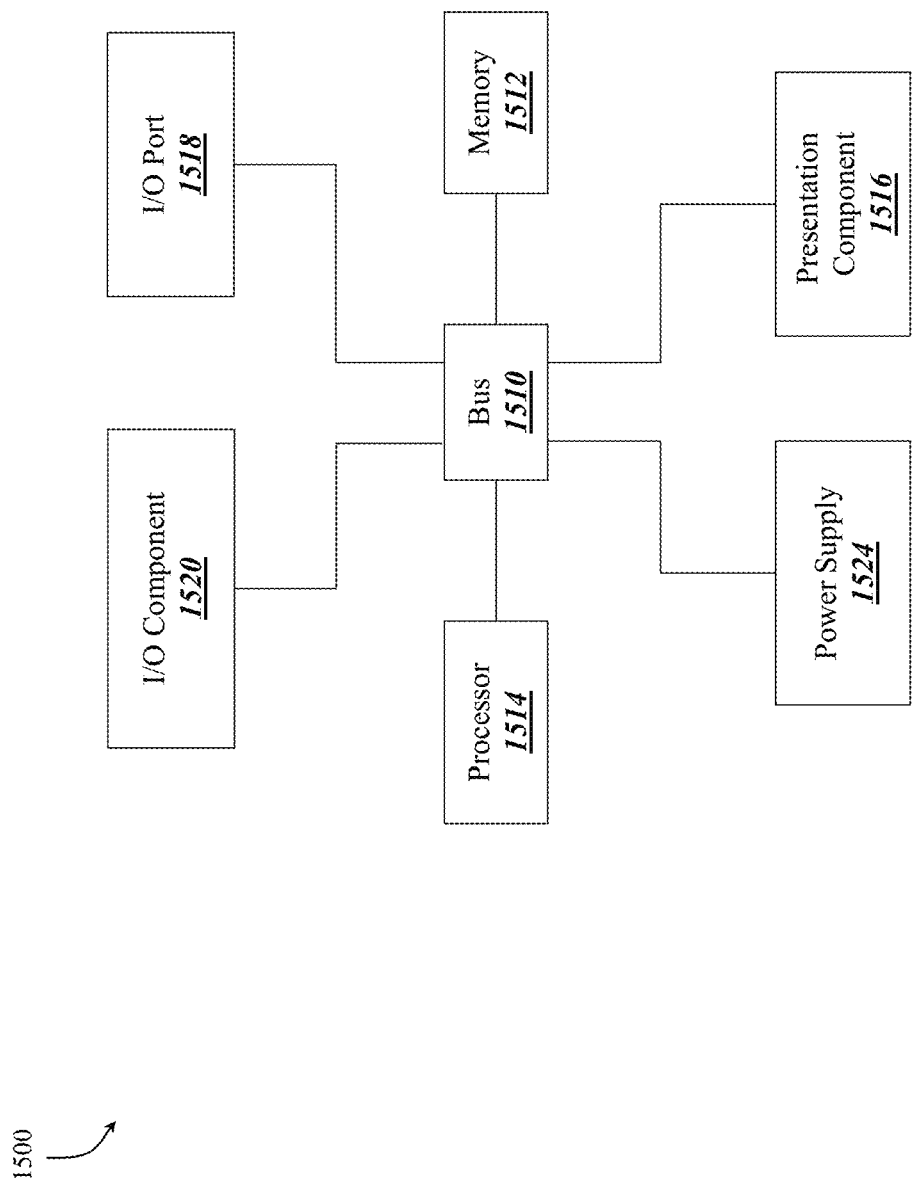
FIG. 15 is an exemplary computing architecture for devices utilized in accordance with the present invention.

Any suitable computing device can be used to implement the computing devices 12, 14, 16, 18, and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1500 is depicted in FIG. 15. The computing device 1500 is merely an illustrative example of a suitable computing environment and in no way limits the scope of the present invention. A "computing device," as represented by FIG. 15, can include a "workstation," a "server," a "laptop," a "desktop," a "hand-held device," a "mobile device," a "tablet computer," or other computing devices, as would be understood by those of skill in the art. Given that the computing device 1500 is depicted for illustrative purposes, embodiments of the present invention may utilize any number of computing devices 1500 in any number of different ways to implement a single embodiment of the present invention. Accordingly, embodiments of the present invention are not limited to a single computing device 1500, as would be appreciated by one with skill in the art, nor are they limited to a single type of implementation or configuration of the example computing device 1500.

The computing device 1500 can include a bus 1510 that can be coupled to one or more of the following illustrative components, directly or indirectly: a memory 1512, one or more processors 1514, one or more presentation components 1516, input/output ports 1518, input/output components 1520, and a power supply 1524. One of skill in the art will appreciate that the bus 1510 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 15 is merely illustrative of an exemplary computing device that can be used to implement one or more embodiments of the present invention, and in no way limits the invention.

The computing device 1500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices that can be used to encode information and can be accessed by the computing device 1500.

The memory 1512 can include computer-storage media in the form of volatile and/or nonvolatile memory. The memory 1512 may be removable, non-removable, or any combination thereof. Exemplary hardware devices are devices such as hard drives, solid-state memory, optical-disc drives, and the like. The computing device 1500 can include one or more processors that read data from components such as the memory 1512, the various I/O components 1516, etc. Presentation component(s) 1516 present data indications to a user or other device. Exemplary presentation components include a display device, speaker, printing component, vibrating component, etc.

The I/O ports 1518 can enable the computing device 1500 to be logically coupled to other devices, such as I/O components 1520. Some of the I/O components 1520 can be built into the computing device 1500. Examples of such I/O components 1520 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer system for stabilizing value of tokens of a digital currency for compensating service providers for use of computer resources in a service provider network, wherein the digital currency comprises tokens made available through smart contracts on a blockchain, wherein the tokens include reserve tokens for managing price stability of the digital currency and utility tokens for compensating the service providers, the computer system comprising:
   at least one miner node, comprising at least one computing device programmed with computer program logic to be configured to trigger digital currency transactions that affect at least one of a value of utility tokens or an amount of supply of utility tokens; and
   a stabilizer device, comprising at least one computing device programmed with computer program logic to be configured to, in response to digital currency transactions including a transfer of utility tokens of the stabilized digital currency, run a stabilization process that maintains a target value for the utility tokens;
   wherein the smart contracts on the blockchain implementing the tokens include, within logic for functions implementing transfer of utility tokens, logic to invoke the stabilization process such that the stabilization process is run automatically in response to every digital currency transaction that affects at least one of the value of the utility tokens or the amount of supply of utility tokens;
   wherein the stabilizer device is configured to:
   identify a deflation period, inflation period, or stable period based on at least a current value of utility tokens and a current amount of supply of utility tokens,
   determine an amount for a new supply of utility tokens to maintain the target value for the utility tokens based on the identified inflation period, deflation period or stable period, and any amount of reserve tokens to be minted, and
   run the stabilization process, in response to a digital currency transaction in the service provider network transferring an amount of utility tokens to a service provider, to:
      i. for a deflation period, convert utility tokens to reserve tokens to meet the determined amount for the new supply of utility tokens,
      ii. for an inflation period, convert reserve tokens to utility tokens to meet the determined amount for the new supply of utility tokens, and
      iii. for a stable period, mint the amount of reserve tokens.

2. The computer system of claim 1, wherein the stabilizer device is further configured to:
   store the reserve tokens in one or more of a reserve pool or an investor pool.

3. The computer system of claim 2, wherein the stabilizer device is further configured to:
   distribute the reserve tokens within at least one of the reserve pool and the investor pool to stabilize the utility token values.

4. The computer system of claim 3, wherein the stabilizer device is further configured to:
   periodically convert the reserve tokens in the investor pool to payments to investors.

5. The computer system of claim 1, wherein the digital currency further comprises security tokens representing tradeable shares for payment of periodic dividends.

6. The computer system of claim 4, wherein, to periodically convert the reserve tokens to payments, the stabilizer device is further configured to:
   store reserve tokens from a current period of time in a first portion of the investor pool;
   store reserve tokens from a previous period of time in a second portion of the investor pool; and
   convert the reserve tokens from the previous period of time to payments to investors at an end of the current period of time.

7. A computer system for stabilizing value of tokens of a digital currency made available through smart contracts on a blockchain, wherein the tokens include reserve tokens for managing price stability of the digital currency and utility tokens, the computer system comprising:
   a stabilizer device, comprising at least one computing device programmed with computer program logic to be configured to, in response to transactions including a transfer of utility tokens that affect at least one of a value of utility tokens or an amount of supply of utility tokens, run a stabilization process that maintains a target value for utility tokens;
   wherein the smart contracts on the blockchain implementing the tokens include, within logic for functions implementing transfer of utility tokens, logic to invoke the stabilization process such that the stabilization process is run automatically in response to every transfer of utility tokens that affects at least one of the value of the utility tokens or the amount of supply of utility tokens;
   wherein the stabilizer device, to run the stabilization process, is configured to:
   identify a deflation period, inflation period, or stable period based on at least a current value of utility tokens and a current amount of supply of utility tokens,
   determine an amount for a new supply of utility tokens to maintain the target value for the utility tokens based on the identified inflation period, deflation period or stable period, and any amount of reserve tokens to be minted, and
   in response to a transaction transferring an amount of utility tokens from a first owner to a second owner:
      i. for a deflation period, convert utility tokens to reserve tokens to meet the determined amount for the new supply of utility tokens,
      ii. for an inflation period, convert reserve tokens to utility tokens to meet the determined amount for the new supply of utility tokens, and
      iii. for a stable period, mint the amount of reserve tokens.

8. The computer system of claim 7, wherein the stabilizer device is further configured to store the reserve tokens in a reserve pool including a fixed size reserve pool and a variable size investor pool.

9. The computer system of claim 8, wherein the stabilizer device is further configured to distribute the reserve tokens within at least one of the reserve pool and the investor pool to stabilize the utility token values.

10. The computer system of claim 9, wherein the stabilizer device is further configured to periodically convert the reserve tokens in the investor pool to payments to investors.

11. The computer system of claim 7, wherein the digital currency further comprises security tokens representing tradeable shares for payment of periodic dividends.

12. The computer system of claim 10, wherein, to periodically convert the reserve tokens to payments, the stabilizer device is further configured to:
- store reserve tokens from a current period of time in a first portion of the investor pool;
- store reserve tokens from a previous period of time in a second portion of the investor pool; and
- convert the reserve tokens from the previous period of time to payments to investors at an end of the current period of time.

13. A computer system for stabilizing value of tokens of a digital currency made available through smart contracts on a blockchain, wherein the tokens include reserve tokens for managing price stability of the digital currency and utility tokens, the computer system comprising:
- a stabilizer device, comprising at least one computing device programmed with computer program logic to be configured to, in response to transactions including a transfer of utility tokens that affect at least one of a value of utility tokens or an amount of supply of utility tokens, run a stabilization process that maintains a target value for utility tokens;
- wherein the smart contracts on the blockchain implementing the tokens include, within logic for functions implementing transfer of utility tokens, logic to invoke the stabilization process such that the stabilization process is run automatically in response to every transfer of utility tokens that affects at least one of the value of the utility tokens or the amount of supply of utility tokens;
- wherein the stabilizer device, to run the stabilization process, is configured to:
- identify a deflation period, inflation period, or stable period based on at least a current value of utility tokens and a current amount of supply of utility tokens,
- determine an amount for a new supply of utility tokens to maintain the target value for the utility tokens based on the identified inflation period, deflation period or stable period, and any amount of reserve tokens to be minted, and
- in response to a transaction transferring an amount of utility tokens from a first owner to a second owner:
  - i. in a deflation period, convert utility tokens to reserve tokens to meet a determined amount for a new supply of utility tokens to maintain a target value for the utility tokens based on the deflation period;
  - ii. in an inflation period, convert reserve tokens to utility tokens, to meet a determined amount for a new supply of utility tokens to maintain a target value for the utility tokens based on the inflation period; and
  - iii. in a stable period, mint reserve tokens to maintain a minimal amount of reserve tokens.

14. The computer system of claim 13, wherein the stabilizer device is further configured to store the reserve tokens in a reserve pool including a fixed size reserve pool and a variable size investor pool.

15. The computer system of claim 14, wherein the stabilizer device is further configured to distribute the reserve tokens within at least one of the reserve pool and the investor pool to stabilize the utility token values.

16. The computer system of claim 15, wherein the stabilizer device is further configured to periodically convert the reserve tokens in the investor pool to payments to investors.

17. The computer system of claim 13, wherein the digital currency further comprises security tokens representing tradeable shares for payment of periodic dividends.

18. The computer system of claim 16, wherein, to periodically convert the reserve tokens to payments, the stabilizer device is further configured to:
- store reserve tokens from a current period of time in a first portion of the investor pool;
- store reserve tokens from a previous period of time in a second portion of the investor pool; and
- convert the reserve tokens from the previous period of time to payments to investors at an end of the current period of time.

19. The computer system of claim 13, wherein, in an inflation period, the stabilization process further comprises minting reserve tokens.

20. The computer system of claim 13, wherein, in a deflation period, the stabilization process further comprises minting reserve tokens.

* * * * *